（12） United States Patent
Lam

(10) Patent No.: US 9,353,543 B2
(45) Date of Patent: *May 31, 2016

(54) EFFICIENT LAYOUT AND DESIGN OF PRODUCTION FACILITY

(75) Inventor: Wei Chak Joseph Lam, Singapore (SG)

(73) Assignee: BEACONS PHARMACEUTICAL PTE LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/982,853

(22) Filed: Dec. 30, 2010

(65) Prior Publication Data

US 2011/0209336 A1 Sep. 1, 2011

Related U.S. Application Data

(63) Continuation of application No. 11/930,204, filed on Oct. 31, 2007, now abandoned, which is a continuation-in-part of application No. 10/248,729, filed on Feb. 13, 2003, now Pat. No. 8,621,786, which is a continuation-in-part of application No. 10/172,327, filed on Jun. 14, 2002, now Pat. No. 7,269,925.

(51) Int. Cl.
E04H 5/02 (2006.01)

(52) U.S. Cl.
CPC . *E04H 5/02* (2013.01); *Y02P 90/14* (2015.11); *Y02P 90/18* (2015.11); *Y02P 90/22* (2015.11); *Y02P 90/265* (2015.11); *Y10T 29/49* (2015.01)

(58) Field of Classification Search
CPC .......... E04H 5/02; Y02P 90/22; Y02P 90/265

USPC ................ 52/79.1, 79.3–79.4, 79.6–79.8, 33, 52/36.1, 174, 82

See application file for complete search history.

(56) References Cited

U.S. PATENT DOCUMENTS

| 2,154,897 A | 4/1939 | Grant |
| 2,604,670 A | 7/1952 | Horowitz et al. |
| 3,341,428 A | 9/1967 | McManus |
| 3,395,502 A | 8/1968 | Frey |
| 4,429,501 A | 2/1984 | de Brabant |
| 4,612,741 A | 9/1986 | Jacobson |

(Continued)

FOREIGN PATENT DOCUMENTS

| JP | 03268104 | 11/1991 |
| JP | 4240714 | 8/1992 |

(Continued)

OTHER PUBLICATIONS

Benjaafar, S., Heragu, S.S. and Irani, S., Next Generation Factory Layouts, 2001, Regents of the University of Minnesota, p. 12.

(Continued)

*Primary Examiner* — Elizabeth A Quast
(74) *Attorney, Agent, or Firm* — Horizon IP Pte. Ltd.

(57) ABSTRACT

Methods for manufacturing a product or pharmaceutical product in an improved production layout are disclosed. The layout includes a production area which includes a hub which is at least partially surrounded by a manufacturing area. The manufacturing area comprises production stages used in the manufacturing process. The hub, having direct line-of-sight to the production stages, can easily monitor the manufacturing process.

20 Claims, 14 Drawing Sheets

(56) References Cited

U.S. PATENT DOCUMENTS

| | | |
|---|---|---|
| 5,050,354 A | 9/1991 | Vendramini |
| 5,076,205 A | 12/1991 | Vowles et al. |
| 5,186,718 A | 2/1993 | Tepman et al. |
| 5,355,395 A | 10/1994 | Kenneth et al. |
| 5,632,859 A | 5/1997 | Heitto et al. |
| 5,795,356 A | 8/1998 | Leveen |
| 5,809,708 A | 9/1998 | Greer et al. |
| 5,860,258 A | 1/1999 | Faith et al. |
| 6,055,792 A | 5/2000 | Kovacs et al. |
| 6,099,599 A | 8/2000 | Wu |
| 6,216,398 B1 | 4/2001 | Shipman et al. |
| 6,253,504 B1 | 7/2001 | Cohen et al. |
| 6,360,494 B1 | 3/2002 | Emerson |
| 6,640,878 B2 | 11/2003 | Allor et al. |
| 6,748,704 B2 | 6/2004 | Eguchi et al. |
| 6,996,448 B2 | 2/2006 | Huang et al. |
| 2002/0046518 A1 | 4/2002 | Eguchi et al. |
| 2002/0193972 A1 | 12/2002 | Kudo et al. |
| 2006/0204670 A1 | 9/2006 | Siegel |
| 2007/0244594 A1 | 10/2007 | Chik et al. |

FOREIGN PATENT DOCUMENTS

| | | |
|---|---|---|
| JP | 07317346 | 12/1995 |
| JP | 8003280 | 1/1996 |
| JP | 11176712 | 7/1999 |
| JP | 2002-070345 | 3/2002 |
| NL | 45940 C | 6/1939 |

OTHER PUBLICATIONS

Feld, William M., Lean Manufacturing: Tool, Techniques, and How to Use Them, 2001, St. Lucie Press, p. 74.

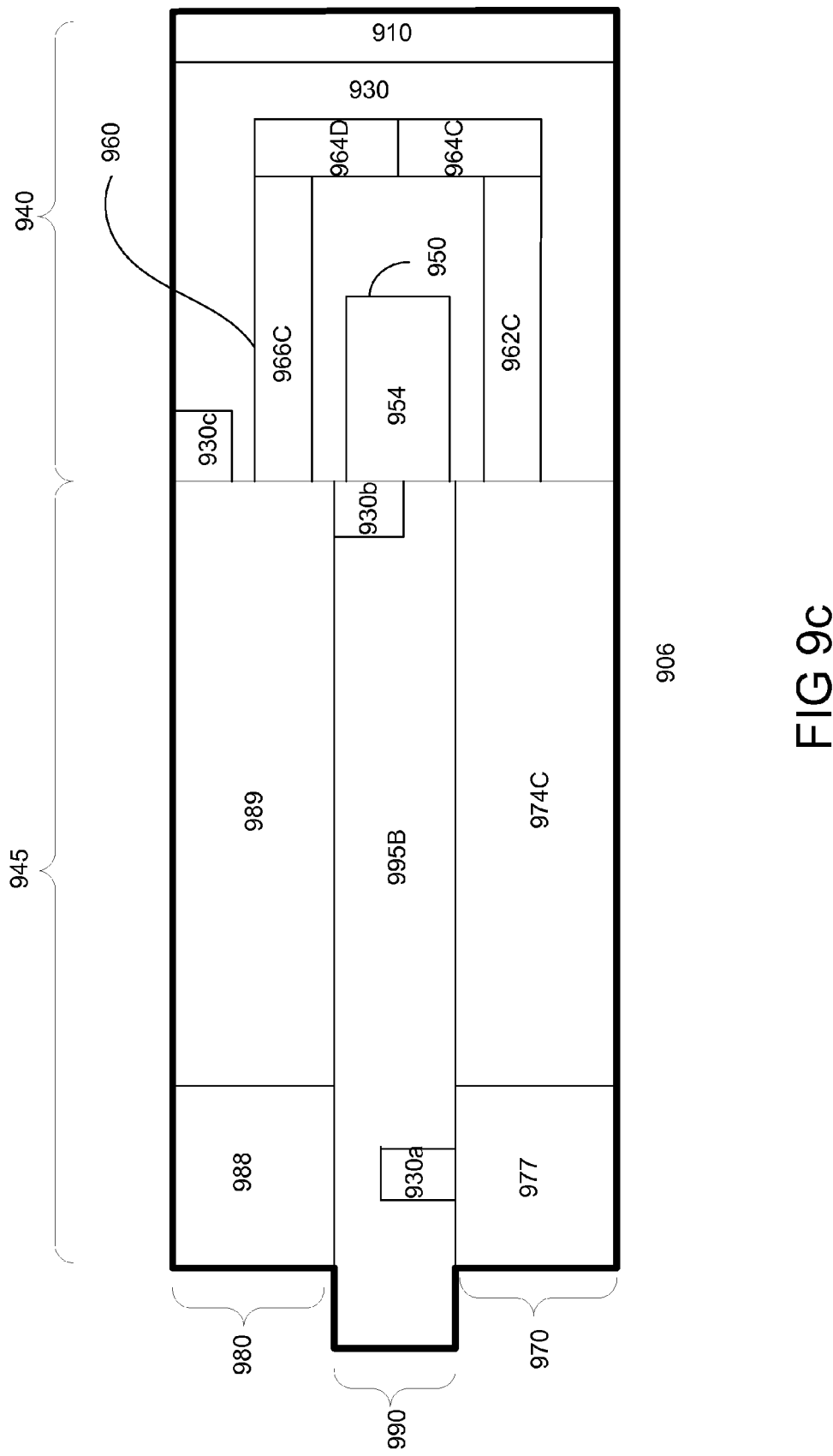

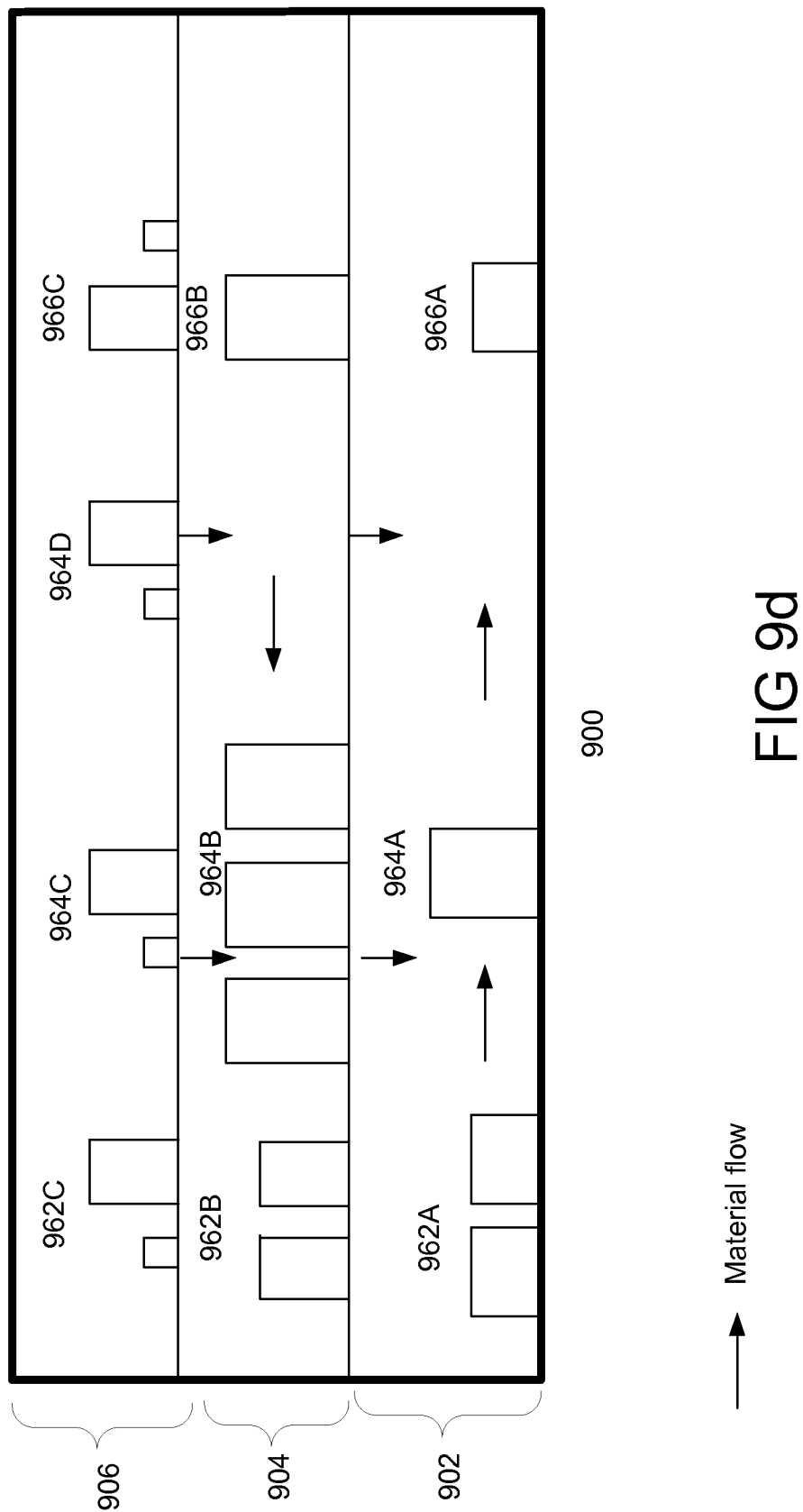

EFFICIENT LAYOUT AND DESIGN OF PRODUCTION FACILITY

CROSS REFERENCES TO RELATED APPLICATIONS

This application is a Continuation application which claims benefit of co-pending U.S. patent application Ser. No. 11/930,204 filed Oct. 31, 2007 and entitled "Efficient Layout and Design of Production Facility", which is a Continuation-In-Part application which claims benefit of co-pending U.S. patent application Ser. No. 10/248,729 filed Feb. 13, 2003 and entitled "Efficient Layout and Design of Production Facility", which is a Continuation-In-Part application and claims benefit of U.S. patent application Ser. No. 10/172,327 filed Jun. 14, 2002 and entitled "Layout of Production Facility", now U.S. Pat. No. 7,269,925. These applications are hereby incorporated by reference in their entireties.

FIELD OF THE INVENTION

The invention relates generally to production facilities. More particularly, the invention relates to improved layouts and design for pharmaceutical production and operation facilities which are compliant with current good manufacturing practices (CGMP).

BACKGROUND OF THE INVENTION

Ideally, the layout of a manufacturing facility should promote efficient flow of work and people. Additionally, the layout should facilitate production, production control, and quality control. For example, the layout should be configured to facilitate quality assurance to minimize defects and operation difficulties, thus ensuring manufacturing and product quality. Quality initiatives also should be built into the facility. This is essential and particularly important for the pharmaceutical manufacturing industry which operates under a strict regulatory environment.

In the United States, the pharmaceutical manufacturing industry must comply with "Current Good Manufacturing Practices" (CGMP) promulgated by the Food and Drug Administration (FDA). See 21 CFR §§210-226. Other regulations or guidelines which the pharmaceutical industry may be subjected to include, for example, World Health Organization GMP guidelines and Pharmaceutical Inspection Co-operation Scheme (PIC/S).

CGMP defines requirements with which a drug manufacturing facility and process must comply. This includes for example, having the building and facility suitably designed and constructed to facilitate cleaning, maintenance and proper operations. See 21 CFR §211.42. The flow of components, drug containers, closures, labeling, in-process materials, and drug products through the building or buildings shall be designed to prevent contamination and defined areas should be configured to prevent mix-ups and contaminations. See 21 CFR §211.42 (a)(b)(c). Premises should be laid out in such a way as to allow the production to take place in areas connected in a logical order corresponding to the sequence of the operations and to the requisite cleanliness levels. See PICS 3.7. Also, equipment should be suitably located to facilitate operations for each intended use as well as cleaning and maintenance. See 21 CFR §211.63. Quality Personnel should have access to production area for sampling and investigational as appropriate. See PICS 6.4. There is a need to identify significant steps of operations of equipments, personals and batches. See 21 CFR 211.188-11 & 211.105. These are just some of the myriad of requirements under CGMP.

Non-conformity with CGMP renders a drug "adulterated" under the Food, Drug and Cosmetics Act. See 21 USC §501(a)(2)(B). A drug is deemed adulterated "if the methods used in, or the facilities or the controls used for its manufacture, process, packing or holding do not conform to or are not operated or administered in conformity with CGMP." The purpose of 21 USC §501(a)(2)(B) is to protect public interest, by ensuring that the drugs marketed meet its regulated claims specifications. To prevent a drug product from being deemed adulterated, a total quality control, approach and system is necessary. A failure to comply with any regulations may result in the drug being withdrawn from the market, as well as subjecting the manufacturer to sanction. This places a heavy burden on the manufacturer to ensure compliance with CGMP.

However, ambiguity in the language of the statute subjects it to interpretation and imparts uncertainty about the requirements for compliance. For example, compliance is not ensured even though the quality manufacturing process or engineering facility is considered "average" compared to the industry. This is because compliance with the regulations requires that a pharmaceutical product must be manufactured by current good manufacturing practice methods, controls and system in order to protect the public. The absence of a consistent and widely accepted interpretation of some of regulatory requirements has led to increased cost in engineering new facilities. This has also led to longer lead-times in engineering and, in some cases, delays in bringing new pharmaceutical products to market. In an attempt to clarify the regulatory requirements, the International Society for Pharmaceutical Engineering and the FDA have cooperated to publish a Baseline® Pharmaceutical Engineering Guide (Guide).

The Guide includes suggestions from the FDA for compliance with CGMP. The main basic philosophy promoted by the Guide is "Good Engineering Practice" (GEP), which is defined as "established engineering methods and standards that are applied throughout the project life cycle to deliver appropriate and cost effective solutions". It takes into account the design and installation of facilities and equipment and takes "full account of CGMP, safety, health, environmental, ergonomic, operational, maintenance, recognized industry guidance, and statutory requirements". See Guide. In addition to protecting the integrity of the drugs, the safety of the operators and visitors must be considered in the engineering design.

In an engineering design of a facility, people, material, production system and utility systems are the variable elements that we have to consider and to establish control in order to establish and practice CGMP. For people and material flows, the layout design of the facility is the primary control to establish CGMP. A production layout should also consider the entire life cycle of the product in terms of daily provision for cleaning, utility support area, calibration, monitoring, storage of materials and equipments, and the long term life cycle requirements for qualification, validation, periodical maintenance, changes like retrofitting, renovating, decommissioning, selling, re-starting and even relocating. Therefore, without an effective and efficient layout design, it will be difficult for the management and the operator to practice CGMP efficiently. The controls of the production systems and utility systems, on the other hand, are primarily established by system design and are maintained by monitoring the systems. Therefore, layout and design of the facility are critical controls to establish and practice CGMP. The design goals and issues are to prevent cross contamination, ability to process multiple components concurrently and to ensure integrity of final product. Specifically, layout should allow appropriate access, grouped activities together to maximize flexibility and designated or segregation areas for materials and people flows to minimize contamination and to provide efficient production operations. For all product categories and all process steps, materials, components and products must be segregated for materials incoming, quarantine, release and rejected and outgoing products to be quarantined and released. Design and layout segregation protect the open product from environmental contamination as it progresses through a series of unit operations. The segregation can only be accomplished through physical, environmental and through less effective chronological time separation and procedural. For example, segregation by space (spatial) may include a dedicated built in path of travel and segregation by time may include sequencing clean and dirty items or materials at different stages of cleanliness through the same area. Other segregation by environmental control may include a classified area for a unit operation where the products are exposed and local protection system may be inadequate. Designed segregation by closed systems avoids the additional measures needed to protect an open process. Good CGMP design features include dedicated and adequate wash/storage areas, interior windows for good communications and safety.

FIG. 1 shows a layout of a conventional pharmaceutical manufacturing facility 101. As shown, the facility comprises a rectangular shaped building with two levels 103a and 103b. Typically, the production area 140 is located on the ground level 103a while non-production areas are located on the second level 103b. Also located on the ground level are storage area 195, and packing area 197. Additional areas, such as changing area 194, cafeteria 191, engineering area 193 can also be included on the ground level. The non-production areas on the second level include administration area 108, laboratory area 141, storage area 145, and HVAC plant room 146. In some facilities, all the different areas are provided in a single level.

The various production suites 165 form different stages of a production line for manufacturing pharmaceutical products. Products are tested in their various stages for quality control. The finished products are transferred to the packing area for packaging and then to the storage area.

Although such a layout may comply with CGMP, it is, however, inefficient. For example, quality assurance and quality control cannot be easily carried out in such conventional layouts. The different production stages are not visible from a single point, making it inconvenient to monitor, identify, and verify the manufacturing process. Such deficiencies increase process time in identification and quality monitoring. Therefore, a manufacturer incurs additional costs to ensure that the process can be monitored adequately for verification and quality control, rendering such layouts not cost effective.

From the foregoing discussion, it is desirable to provide a more efficient and cost effective layout for a manufacturing facility.

SUMMARY OF THE INVENTION

The invention relates to methods for manufacturing a product or pharmaceutical product in an improved layout for a manufacturing facility. In one embodiment, the method includes providing enclosed structure containing a manufacturing facility; the manufacturing facility has abutting production and non-production areas. The production area includes a hub having a first hub portion which abuts the non-production area and a manufacturing area which surrounds a second hub portion. The manufacturing area includes first or inflow manufacturing end and second or outflow manufacturing end, the inflow and outflow manufacturing ends abut the non-production area. The non-production area has inflow non-production areas, the inflow non-production area has first and second inflow ends wherein the second inflow end abuts the first manufacturing end and an outflow non-production area has first and second outflow ends, the first outflow end of the non-production area abuts the second manufacturing end of the manufacturing area. The method further includes the steps of receiving raw materials for the manufacturing of the product at the first end of the inflow non-production area and transferring raw materials to the production area to be processed to form a processed product. The processed product is transferred from the production area to the outflow non-production area. The method also includes the step of post processing of the processed product in the outflow non-production area, wherein processing flow from raw materials to processed products comprises a sequential or continuous flow progressing from the first inflow end to the second outflow end.

In another embodiment of the invention, a method for manufacturing a product or pharmaceutical product is presented. The method includes providing enclosed structure containing a hub and a manufacturing area which surrounds the hub. The manufacturing area has first inflow and second outflow manufacturing ends. The method further comprises the steps of receiving raw materials in the inflow end of the manufacturing area and processing raw material to produce the product or pharmaceutical product in the manufacturing area. The product is transferred out of the manufacturing area at the outflow end, wherein processing flow from raw materials to the products comprises a sequential or continuous flow progressing from the inflow end to the second outflow end.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF DRAWINGS

In the drawings, like reference characters generally refer to the same parts throughout the different views. Also the drawings are not necessarily to scale, emphasis instead generally being placed upon illustrating the principles of the invention. Various embodiments of the present invention are described with references to the following drawings, in which:

FIGS. 9a-c show first, second and third levels of a production facility in accordance with one embodiment of the invention; and FIG. 9d shows a cross section of a production facility in accordance with one embodiment of the invention.

DETAILED DESCRIPTION OF THE INVENTION

Figure 1:
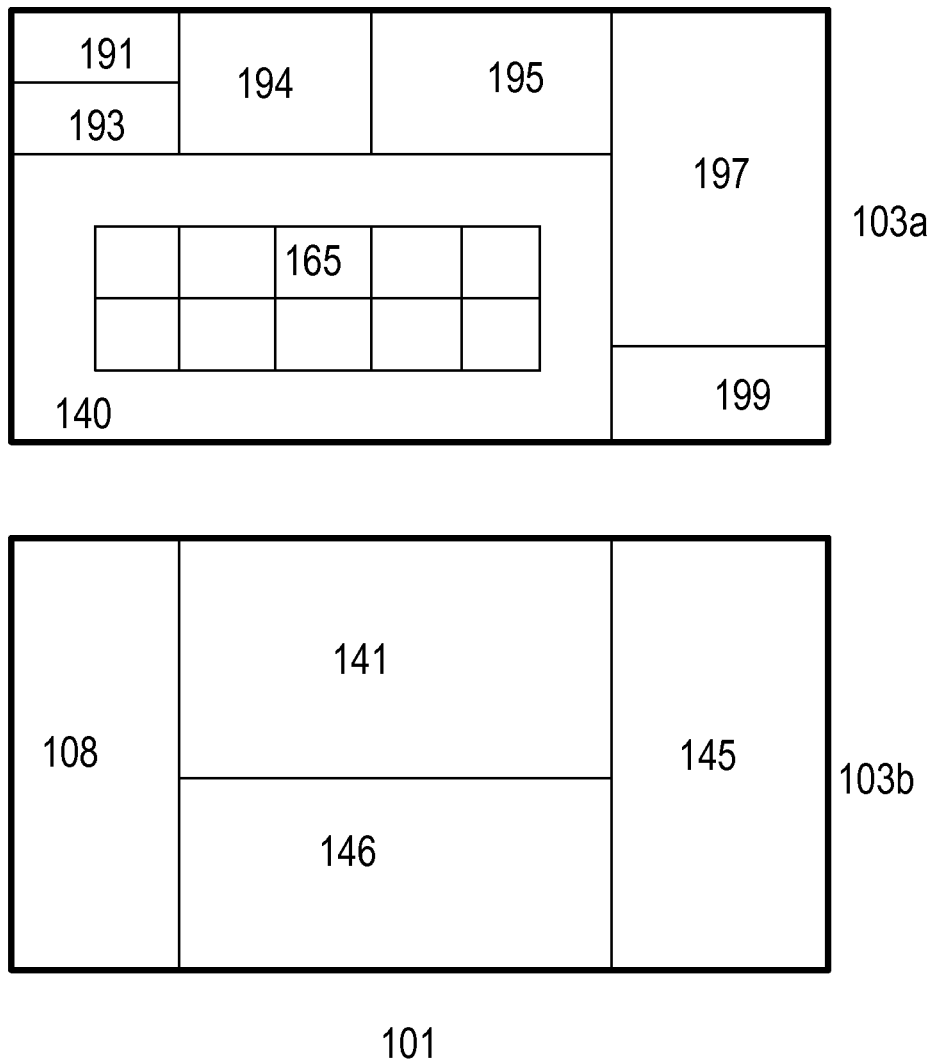
FIG. 1 shows a conventional layout of a production facility.
Figure 2:
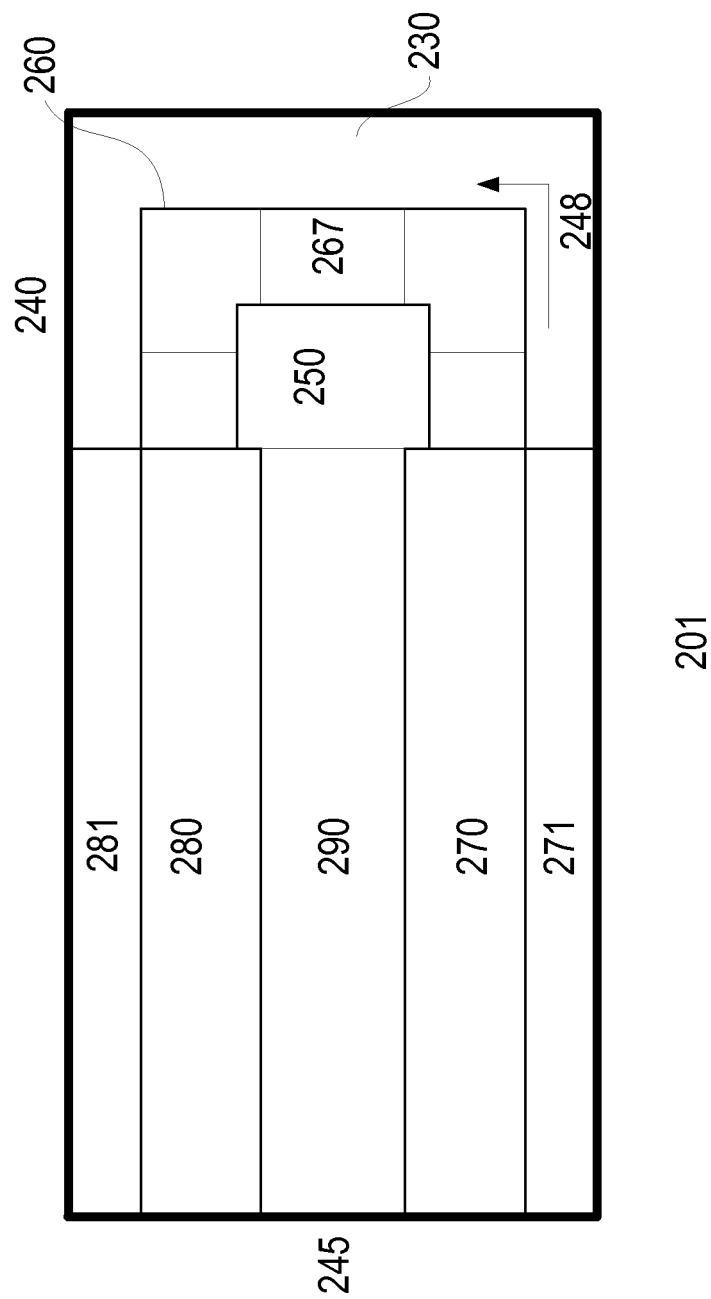
FIG. 2 shows a layout of a production facility in accordance with one embodiment of the invention.

FIG. 2 shows a building 201 of a production facility in accordance with one embodiment of the invention. Illustratively, the building is depicted as having a rectangular shape. Other geometric shapes are also useful. In one embodiment, the building comprises production area 240 and non production or production support area 245. As shown, the production area is located on one side of the building while the production support area is located on the other side. Other configurations of production and production support areas are also useful. For example, the production support area can be located on opposite sides of the production area. One or more pathways or corridors can be provided to interconnect sections of the production support areas, if desired. Alternatively, the production support area can be located on different sides, partially or fully surrounding the production area. For example, the production support area can surround two adjacent, three, or all sides of the production area.

In another embodiment, the production and production support areas can be located on different levels of the building. For example, the building can comprise first and second levels, with the production area in the first level and the production support area on the second level. Providing a building with more than two levels is also useful. The first level is, for example, the lower level. The first level can also be the top level. Providing a layout in which the production and production support areas are located on different levels advantageously reduces the building's footprint (e.g., size of building). Expansion can be achieved by adding additional levels, as needed. Alternatively, expansion can be achieved by enlarging the building's footprint. In another embodiment, the production and production support areas can be located in different buildings. The different buildings can be interconnected by pathways or linkways. Such configurations are described in co-pending patent application U.S. Ser. No. 10/172,327, titled "Layout of Production Facility", which is herein incorporated by reference for all purposes. The production area, as shown, is rectangular in shape. Providing the production area with other shapes is also useful. Hub 250 and manufacturing area 260 are provided in the production area. As shown, the hub comprises a rectangular shape. Providing a hub with other geometric shapes is also useful. For example, the hub can comprise a circular, semicircular, octagonal, semioctagonal, or a combination of different geometric shapes. In one embodiment, a portion of the hub abuts the boundary of the production area. Preferably, the portion of the hub abuts the boundary of the production area which is contiguous or adjacent to the production support area. Providing a hub which does not abut the boundary of the production area is also useful.

In one embodiment, the manufacturing area partially surrounds the hub. Preferably, the manufacturing area surrounds the hub except the portion abutting the boundary of the production area 240. Providing a manufacturing area surrounding the hub completely is also useful. Alternatively, the manufacturing area can be separated into distinct sub-manufacturing areas that partially or fully surround the hub. It is understood that the production sub-manufacturing areas need not be continuous. The manufacturing area comprises a plurality of processing stages used in the manufacturing of one or more products. A processing stage can be used to perform one or more steps in the manufacturing process. For example, stages are used to perform front-end and back-end processes. Providing stages to perform back-end or back-end and front end processes is also useful. The processing stages can form one or more production lines used to form one or more products. Some stages, for example, can be duplicated as desired. Providing more than 2 stages of the same type is also useful.

The sequence of the production stages are preferably arranged to optimize the production process. In one embodiment, the stages are arranged to facilitate flow of work from stage to stage, to the extent possible, in sequence. For example, the sequence of production stages are arranged to facilitate process flow in a counter-clock wise direction, as shown by arrow 248. In one embodiment, various types of production stages for manufacturing pharmaceutical products include, for example, dispensing, granulation, tabletting, coating and capsule filling are arranged in a counter-clock wise direction. Arranging the production stages to facilitate process flow in a clockwise direction is also useful. Other flow arrangements for the production stages are also useful. In one embodiment, each production stage is arranged adjacent to another production stage to form a U-shaped manufacturing area. Other shape is also useful. Alternatively, an access corridor can be provided in between production stages to provide access to a technical area adjacent to the manufacturing area. Limited access path is provided to control people and material flow in the manufacturing area.

In accordance with one embodiment of the invention, the production stages are visible from the hub (i.e., a direct line-of-sight from the hub). If the hub is physically separated from the manufacturing area, the barriers used to separate the hub from the corridor should be at least partially transparent to allow the production stages to be visible from within the hub.

Manufacturing data from the processing stages, in one embodiment, are transferred to the hub. This can be performed in real time or after each process is completed. For example, communication links are provided to one, some, or all the production stages. Manufacturing information is transferred via the communication links to the hub. Thus the hub serves as a control area or center, enabling the manufacturing process to be monitored, identified, and verified easily and efficiently therefrom.

In another embodiment, the hub comprises at least first and second levels. One of the levels serves as the control center or control hub while the other level can serve as a workflow hub or circle corridor. The workflow hub facilitates flow of products and/or people in the manufacturing area. Additionally, the workflow hub can serve as a staging area, work in process storage area and/or support utility area. The workflow hub, for example, can be physically a part of the manufacturing area.

In one embodiment, a laboratory can be provided in the workflow hub for testing of the products at various stages of production. Providing the laboratory at the center allows convenient access from the production stages, increasing manufacturing efficiency. Barriers can be provided, if necessary, to avoid commingling with the production area. The control area is preferably located above the workflow hub. Locating the control area below the workflow hub is also useful. Additional levels can be provided in the hub as desired.

The manufacturing area can be enclosed in an environmentally controlled area (e.g., clean room) to maintain, for example, temperature, humidity, and air quality within desired limits. A controlled environment is particularly useful for manufacturing, for example, pharmaceutical products. The clean room environment is also useful for manufacturing other types of products, for example, semiconductors, chemical products, food processing, biotechnical products.

In one embodiment, different pressure level is provided to control the air quality of critical and non-critical area. For example, high pressure is generally provided in critical areas (e.g. production area, air lock, access corridor and etc.) whereas a relatively low pressure or no pressure is provided in the non-critical areas (e.g. production support area or technical area and etc.), thus creating a pressure gradient. Such pressure gradient, for example, prevents air particles from the non-production area flowing into the production area. In one embodiment, the pressure level in the first level of the manufacturing area is about 12 Pa, whereas the air pressure in the non-production area is about 0 Pa. In embodiments where an access path is provided between the hub and manufacturing area, a pressure level of about 24 Pa is provided. To prevent air particles being introduced into critical area during material flow or people flow, air lock is equipped with even higher pressure such as about 30 Pa. Providing other pressure level is also useful.

To minimize or reduce flow of people or materials in and out of the clean room, the control hub is preferably physically separated from the manufacturing area. Alternatively, the manufacturing area can be a non-clean room environment for manufacturing products which do not require a controlled environment. For example, non-clean room environment can be useful for manufacturing paper or food products.

The manufacturing area can be separated into segments 267, each comprising one or more production stages. The segment can be in different shapes and sizes, even comprises of other corridors and segments. In one embodiment, the segments are physically separated by barriers. Preferably, the segments are completely separated by barriers to create production rooms. The rooms may be in different sizes and shapes. Doors, interlocking rooms, and/or openings are used to provide access to the production rooms. Preferably, at least the portion of the barrier facing the hub is transparent. More preferably, the barriers are transparent, enabling visible communication between the segments as well between the hub and segments. An access path or corridor can be provided between the hub and the manufacturing area to facilitate flow of people and materials, or products from segment to segment. For an environmentally controlled production facility, the access path is preferably part of the clean room or controlled environment. Where a workflow hub is provided, it is preferably part of the controlled environment. Providing a workflow hub which is not part of the controlled environment is also useful.

Segmenting the manufacturing area adds flexibility to the production facility. For example, a segment can be upgraded individually without impacting the other segments. Furthermore, a segment can be expanded individually to increase its capacity by extending the outer barrier without affecting the other segments.

In another embodiment, the manufacturing area is arranged in first and second levels. The additional levels increase capacity without increasing area (e.g., footprint). Providing a manufacturing area with more than two levels is also useful. In accordance with one embodiment of the invention, the manufacturing area comprises a first and a pseudo second level. The levels, for example, are not physically or completely physically separated. Providing levels which are physically separated is also useful. Bins (e.g., intermediate bulk containers (IBCs) or other types of containers) can be located in the upper level. A bin, for example, contains raw materials or partially processed products (generally referred to as processing material) which will be charged or fed to an equipment or a process operation in a production stage for processing. Other techniques for charging, such as vacuum techniques or gravity feed, are also useful. Such techniques are preferred especially where hefty materials, for example, about 100-200 kg materials are discharged for processing. After processing is completed, the processed material is discharged to a bin for transport to either another stage for further processing, testing or packaging. In one embodiment, the charging and discharging are performed outside of the manufacturing area. Performing charging and/or discharging inside or a combination of inside and outside of the manufacturing area is also useful.

In one embodiment, a manufacturing support area 230 surrounds the manufacturing area in the production area. In one embodiment, the manufacturing support area is between the manufacturing area and the boundary of the production area. The manufacturing support area can be in any shape and size. Preferably, the manufacturing support area comprises first and second levels. The first and second levels, for example, correspond to the first and second or pseudo second levels of the manufacturing area. Providing the manufacturing support area with additional levels or other sections within the manufacturing support area is also useful.

The manufacturing support area includes, for example, staging areas or other areas to support production. The manufacturing support area also provides area for retrofitting or servicing the production equipment in the manufacturing area. To reduce or avoid contamination of materials due to servicing or maintenance of equipment used in the manufacturing process, through-the-wall equipment is used. Such types of equipment are designed to be serviced through a wall outside the manufacturing area. In one embodiment, equipments in some or all the production stages are located against the outer wall of the manufacturing area. Calibration of production equipment is conducted frequently to meet the stringent requirements for production of goods, particularly for food, pharmaceutical or semiconductor industry. Through-the-wall equipment and the availability of the manufacturing support area in accordance with one embodiment of the invention, enable calibration and maintenance personnel to conduct proper calibration and upkeep of the production equipment and other assets at the manufacturing support area. Hence, it is not necessary for technical personnel to enter into the manufacturing area with controlled environment to retrofit or calibrate the production tools. This is advantageous as it isolates people from the manufacturing area and thus reduces contamination. The manufacturing support area can include cleaning areas for cleaning such through-the-wall type of equipment. Additional areas for maintaining the equipment can also be included in the manufacturing support area. Also, the manufacturing support area can include one or more cleaning areas for cleaning bins or other equipment. Generally, the manufacturing support area is non-environmentally controlled area. If necessary, a portion or the whole manufacturing support area can be part of the environmentally controlled area.

The manufacturing support area can also facilitate movement of container, bins, and/or carrier devices from stage to stage as well as level to level. In one embodiment, the manufacturing support area includes a transport area or subarea for facilitating the movement of the containers or other carrier devices between the stages and/or levels. The transport area is preferably adjacent to the manufacturing area. It is understood that the transport area need not be physically separated in the manufacturing support area.

The non-production or production support area 245 comprises, for example, sections for storage, packing, quality testing, inspection, receiving materials, material preparation, and dispatching products or material. Additional sections for non-production functions, such as for changing, eating, engineering, administration, security, meeting and offices can also be included in the production support area. Sections for other types of production or production support functions can also be included in the production support area. Preferably, the areas are arranged to optimize flow of material to and processed products from the production area.

In one embodiment, the non-production area comprises inflow and outflow areas 270 and 280. The inflow area comprises preprocessing sections (e.g., receiving, testing, storing, and preparing materials for processing in the manufacturing area). The outflow area comprises post processing sections (e.g., receiving, testing, packaging, and storing finished products). Additional sections that serve other functions can also be provided in the inflow and outflow areas as needed. The various sections of the inflow and outflow areas are arranged to optimize flow of material into and processed products out of the manufacturing area. If the production stages are arranged such that the process flow is in a clock wise direction, the positions of the inflow and outflow corridors could be reversed and still provides a U-shaped process flow.

An inflow and outflow support areas 271 and 281, in one embodiment, can be provided. The inflow support area includes sections that support the flow of material from the point of delivery to processing in the production area. Such sections include, for example, support storage. Other sections, such as waste storage and collection, rejected material storage, labeling of packaging, can also be included. The outflow support area comprises sections that support the flow of processed material from the manufacturing area for delivery to customers or distributors. For example, sections for storage of packaging supplies, support for packaging, packaging office, and packaging inspection. Other sections which serve other functions can also be included.

In one embodiment, the inflow and inflow support areas are contiguous. Likewise the outflow and outflow support areas are contiguous. Preferably the support areas are located between the main corridors and the boundary of the production support area. Providing support areas which are not contiguous to main areas are also useful. In another embodiment, the main areas include sections which serve the functions of support areas.

Preferably, the inflow and outflow areas serve as an extension of the manufacturing area in the production area. The inflow and outflow support areas serve as an extension of the manufacturing support area of the production area. The inflow area, for example, abuts the portion of the manufacturing area at the beginning of the process flow and the outflow area abuts the portion of the manufacturing area at the end of the process flow. The inflow and outflow support areas abuts the manufacturing support area. In one embodiment, the inflow, inflow support, outflow and outflow support areas create a U-shaped flow. Arranging the various corridors, areas, and sections therein to have other flow shapes, such as straight line, is also useful. Additionally, security areas can be provided at the beginning and end of the process flow (e.g., beginning of the inflow and outflow areas).

A support area 290 can also be provided in the production support area. The support area can be of any shape and size. In one embodiment, the support area is adjacent to the inflow and outflow areas. Preferably, the support area is located between the inflow and outflow areas, creating a spine in the production support area. The inflow and outflow areas can be connected at the end opposite the production area, creating a U-shaped inflow/outflow area which surrounds the spine. Alternatively, or additionally, passageways that connect the inflow and outflow areas can be provided along the spine. Likewise, the inflow and outflow support areas can be coupled. Alternatively, only one of either the support or main area sets is connected.

The spine, for example, is an extension of the hub in the production area. An entrance to the building can be located on an end of the spine opposite the end abutting the production area. The entrance preferably is a secured entrance to prevent unauthorized entrance to the building. Locating the entrance in other parts of the spine can also be useful. The spine, for example, serves as a point of entry to the building. Flow of material and people to other sections of the facility are facilitated by the spine.

In one embodiment, the spine can include areas for critical control and monitoring processes which preferably are closely located to the production processes, such as quality control or test laboratory, to enhance quality control and assurance. Preferably, one or more view sub-areas can be provided in the support area, providing a direct line of view to, for example, the packaging, finished product, and/or other areas which require to or should be monitored. Other supporting functions can also be located in the spine. For example, changing area or other areas can be provided. Sections which facilitate access to the manufacturing area as well as the inflow and outflow areas are also useful.

In one embodiment, the spine comprises first and second levels. The first or lower level comprises, for example, an entrance to the building as well as areas for critical control and monitoring processes, such as quality control or test laboratory, to enhance quality control and assurance. The second level preferably includes a view sub-area, providing a direct line of view to, for example, the packaging, finished product, and/or other areas which require to or should be monitored. In one embodiment, first and second sub-view areas are provided, with support sections therebetween. Other supporting functions can also be located in the second level of the spine. For example, a changing area or other areas can be provided. Areas which facilitate access to the manufacturing area as well as the inflow and outflow areas are also useful.

Preferably, the production support area comprises first and second levels. This enables more efficient use of space to house the various sections of the production support area. The first level comprises inflow and outflow areas separated by a first level of the spine. Inflow and outflow support areas can also be provided. The second level can include support functions, such as changing room, meeting rooms, offices, research and development offices, one or more stairwells and/or elevator to enable or facilitate movement between the levels.

Although the production and production support areas are described as separate areas physically separated by a boundary, providing production and production support areas which are partially or fully integrated together is also useful. For example, a boundary between the production and production support areas can be provided for none, one, some, or all of the levels of the production facility.

Figure 3:
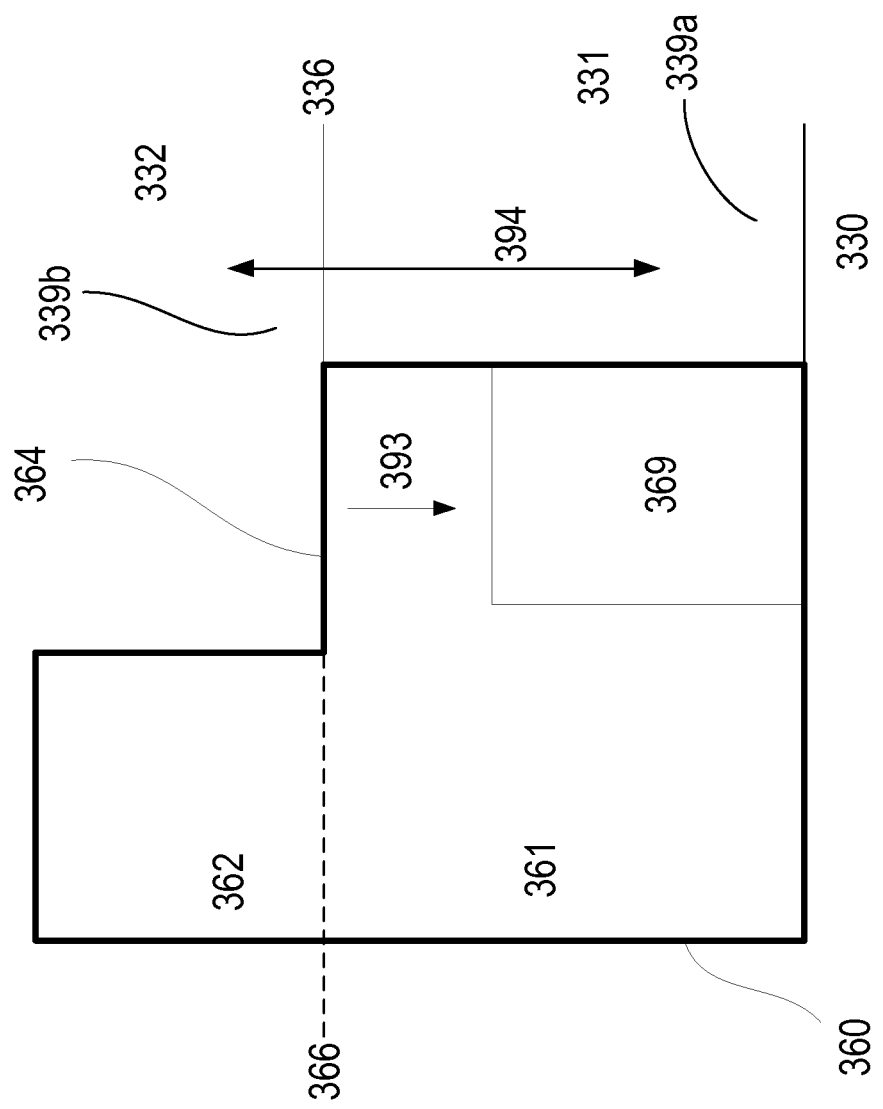
FIG. 3 shows a cross-section of a manufacturing area in accordance with one embodiment of the invention.

FIG. 3 shows a cross-sectional view of a manufacturing area 360 in accordance with one embodiment of the invention. The manufacturing area is part of the environmentally controlled area. In one embodiment, the manufacturing area comprises a first level 361 and a second pseudo level 362, delineated by the dotted line 366. A manufacturing support area 330 surrounds the manufacturing area. The manufacturing support area, in one embodiment, comprises first and second levels corresponding to the levels in the manufacturing area. Unlike the manufacturing area, a floor 336 physically separates the levels of the manufacturing support area. Providing manufacturing support area with one level or additional levels is also useful. In one embodiment, transport areas 339*a-b* are provided in the manufacturing support area, located adjacent to the manufacturing area.

In accordance with one embodiment of the invention, the wall of the second pseudo level adjacent to the manufacturing support area is inset with respect to the first level. This creates a step 364 in the cross-section. The equipment 369 in a production stage is located below the inset. Preferably, the equipment is located against the wall of the manufacturing area adjacent to the manufacturing support area, facilitating maintenance of the equipment in the manufacturing support area. It is understood that not all stages of the manufacturing area need to have the wall in the second level adjacent to manufacturing support area inset with respect to the first level.

A bin containing material or product to be processed (e.g., processing material) can be moved to the step area in the transport area in the second level of the manufacturing support area above the equipment. The processing material can be charged (e.g., delivered) into the production stage below. The processing material, for example, fills the equipment of the processing stage for processing, as indicated by arrow 393. Alternatively, the processing material is used in a process operation. After processing is completed, the processed material is dispensed (e.g., sent) to a bin, for example, in the transport area 339*a* outside of the manufacturing area.

To facilitate charging and dispensing material into and out from the production stages, inflow and outflow docks can be used. The docks are appropriated located, for example, in the step area and on the walls of the manufacturing area adjacent to the manufacturing support area. The bins or containers used for transport of materials can also be mated to the docks, with valves which enable the transfer of material. The valves, for example, are hydraulically or pneumatically controlled. The valves and docks serve to maintain the integrity of the controlled environment of the manufacturing area.

The bin can be moved to another production stage for further processing, testing or packaging (if processing of the product is completed). Lifts or elevators can be employed for moving the bins between the levels. For example, bins are moved from the second to the first level after charging. In one embodiment, prior to having materials dispensed into it, the bin is cleaned. Cleaning can be performed at either level. On the other hand, bins containing processing materials are moved from the first to the second level for charging.

The movement of the bin or bins can be achieved by automated transport systems, reducing the likelihood of mix-ups. Automated transport systems can be facilitated by, for example, rails or tracks. In one embodiment, the automated transport systems are facilitated by a one way track. Alternatively, a two-way track can be provided for transportation of the bins. A two way track provides flexibility in cases where two bins could be transported at the same time for different production stages which require either processing or processed materials simultaneously. Other techniques that can facilitate movement or flow of the bins are also useful. Thus, a bin can be easily moved from one stage to another as well as from one level to another.

In one embodiment, providing a lift at one end of the manufacturing area enables flow of the bins in one direction (i.e. either counter-clock wise or clock wise direction). A lift or elevator, in one embodiment, is provided adjacent to the production stage of which the process flow starts. For example, in a production facility for manufacturing pharmaceutical products, a lift is provided adjacent to the granulation room to facilitate transportation of the bin which contains processing material from first level to second level for discharging into a granulator for granulation. The processed material from the granulator is collected in a bin and then transported to the second level to be discharged for subsequent processing step such as tabletting. In such embodiment, the bins are transported in a U-shaped counter-clock wise direction which is the same as the process flow. Alternatively, a lift can be provided adjacent to the capsule filling production stage. In such arrangement, the bins are transported in a clock wise direction. Hence, the flow of the bins need not be the same as the process flow. In another embodiment of the invention, providing lifts at both ends of the manufacturing area which enables flow of bins in both directions is also useful. In yet another embodiment of the invention, providing a lift in each production stage to facilitate transportation of bins from one level to another level is also useful.

As described, the charging of material is facilitated by gravity, thus avoiding the need to use vacuum techniques which increase the likelihood of contamination. Additionally, by providing an inset 364, the filling process can be performed outside the clean room environment. This reduces the traffic movement of products, materials and people within the manufacturing area, thus minimizing cross contamination. Also, the overall area of the clean room environment can be smaller, which in turn reduces costs. For example, conventional gravity techniques use multi-level production stages for charging equipment in a lower level stage from a higher level stage. Such configuration significantly increases the clean room area needed compared to the present invention.

A buffer zone can optionally be located between the outer wall of the building and the manufacturing area. The buffer zone is particularly useful for applications in which the changes in the production environment can easily impact yields. The buffer zone serves to provide additional insulation between the internal production environment and external building conditions. It also serves as an additional barrier against the entry of insects or other contaminants which can adulterate the products. It can also serve as a security buffer to guard against intrusion and also a safety buffer in the management of products with high toxicity. Where a manufacturing support area is provided, it can also serve as the buffer zone.

In another embodiment, the production area can comprise one or more additional hubs and manufacturing areas. This can be advantageous since the manufacturing support area can be shared, enabling more efficient use of space. The different hubs and manufacturing areas can also share production support area as well. Alternatively, a production support area can be associated with each hub and manufacturing area.

Figure 4:
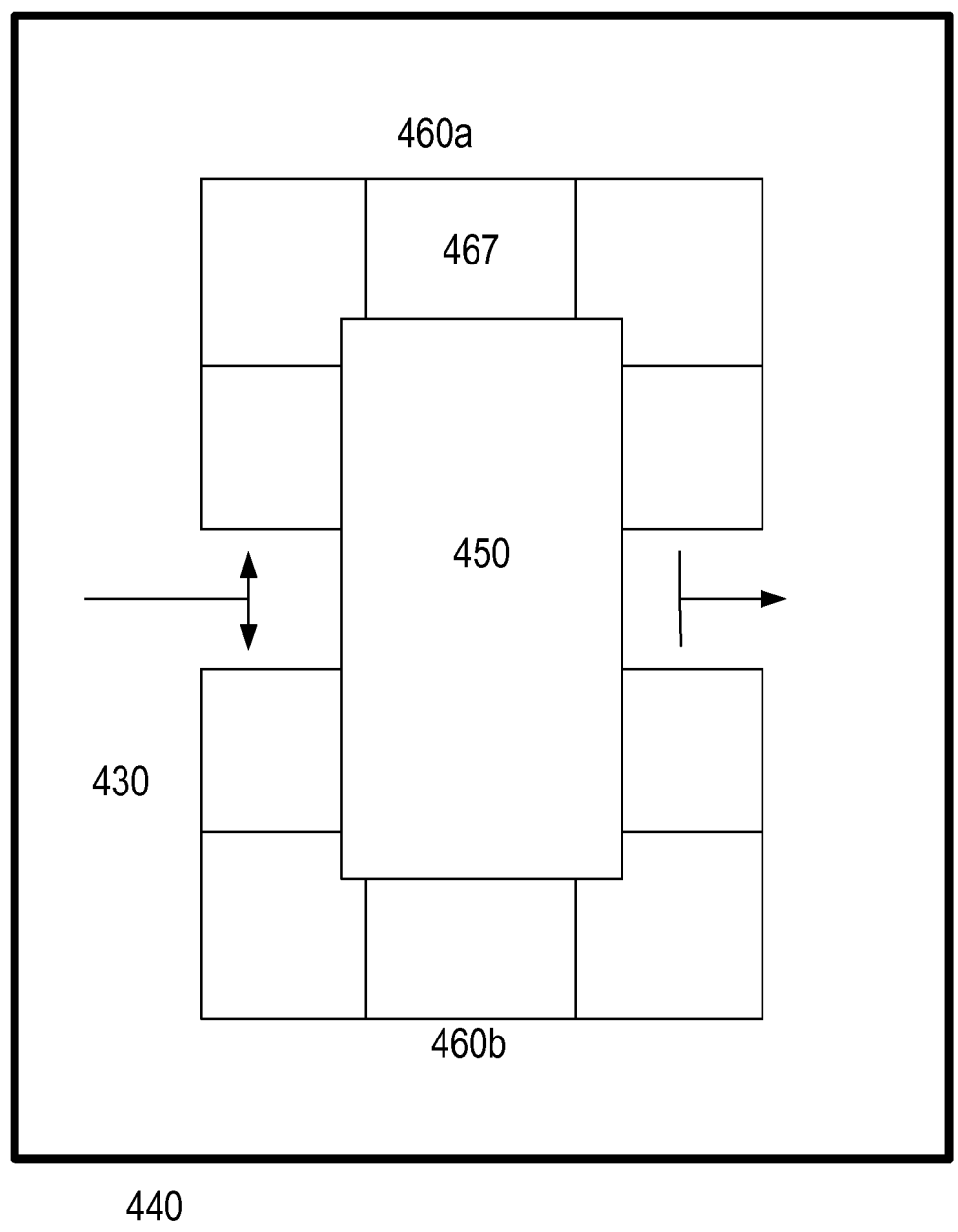
FIG. 4 shows a layout of a production area in accordance with another embodiment of the invention.

FIG. 4 shows another embodiment of a production area 440. As shown, the production area comprises first and second manufacturing areas 460*a-b*, each partially surrounding a common hub 450. Providing other numbers of manufacturing areas which partially surrounds a common hub is also useful. The hub and manufacturing area can have various geometric shapes. The shape or shapes are preferably selected to optimize the layout of hub and manufacturing areas. The various manufacturing areas can be connected or partially connected to partially or completely surround the hub. Providing one manufacturing area which partially or completely surrounds the hub is also useful.

A manufacturing area comprises a plurality of production stages for manufacturing one or more products. Preferably, each manufacturing area manufactures its respective product or products. Providing manufacturing areas which manufacture the same or some of the same products is also useful. The stages are preferably arranged to optimize production flow, to the extent possible. For example, the production flows in from the left sides of the production area to the manufacturing areas out to the right side of the production area. Other flow arrangements are also useful. In one embodiment, a manufacturing support area 430 surrounds the manufacturing areas. The manufacturing support area is shared between the manufacturing areas.

Non-production or production support areas can be located on left and right sides of the production area. Other arrangement of the production support area is also useful. For example, the production support area partially or fully surrounds the production area. Alternatively, providing a production support area on one side of the production area is also useful. In yet another embodiment of the invention, the production support area can be located in another building.

Figure 5:
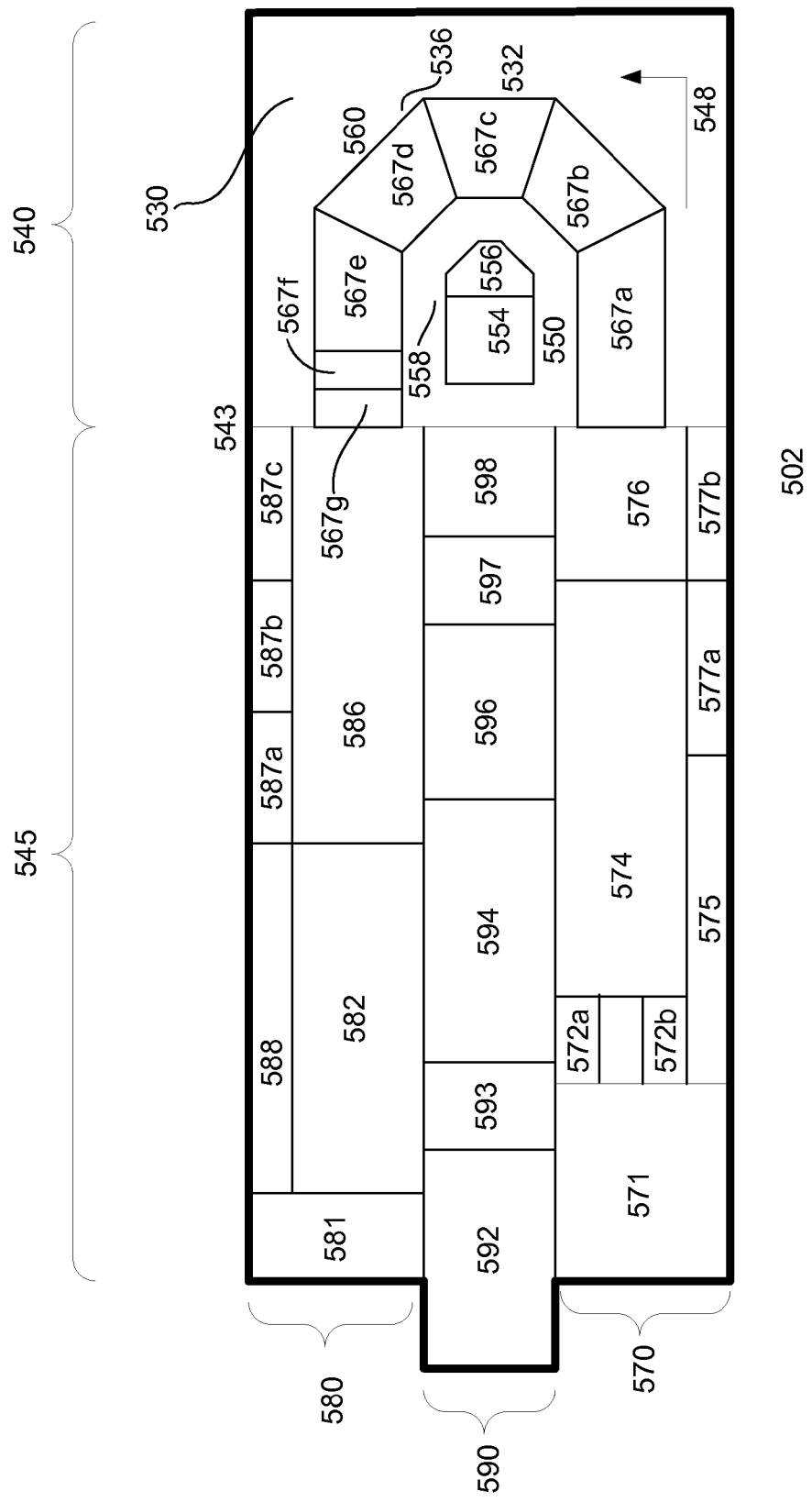
FIGS. 5-6 show a layout of a production facility in accordance with another embodiment of the invention.
Figure 6:
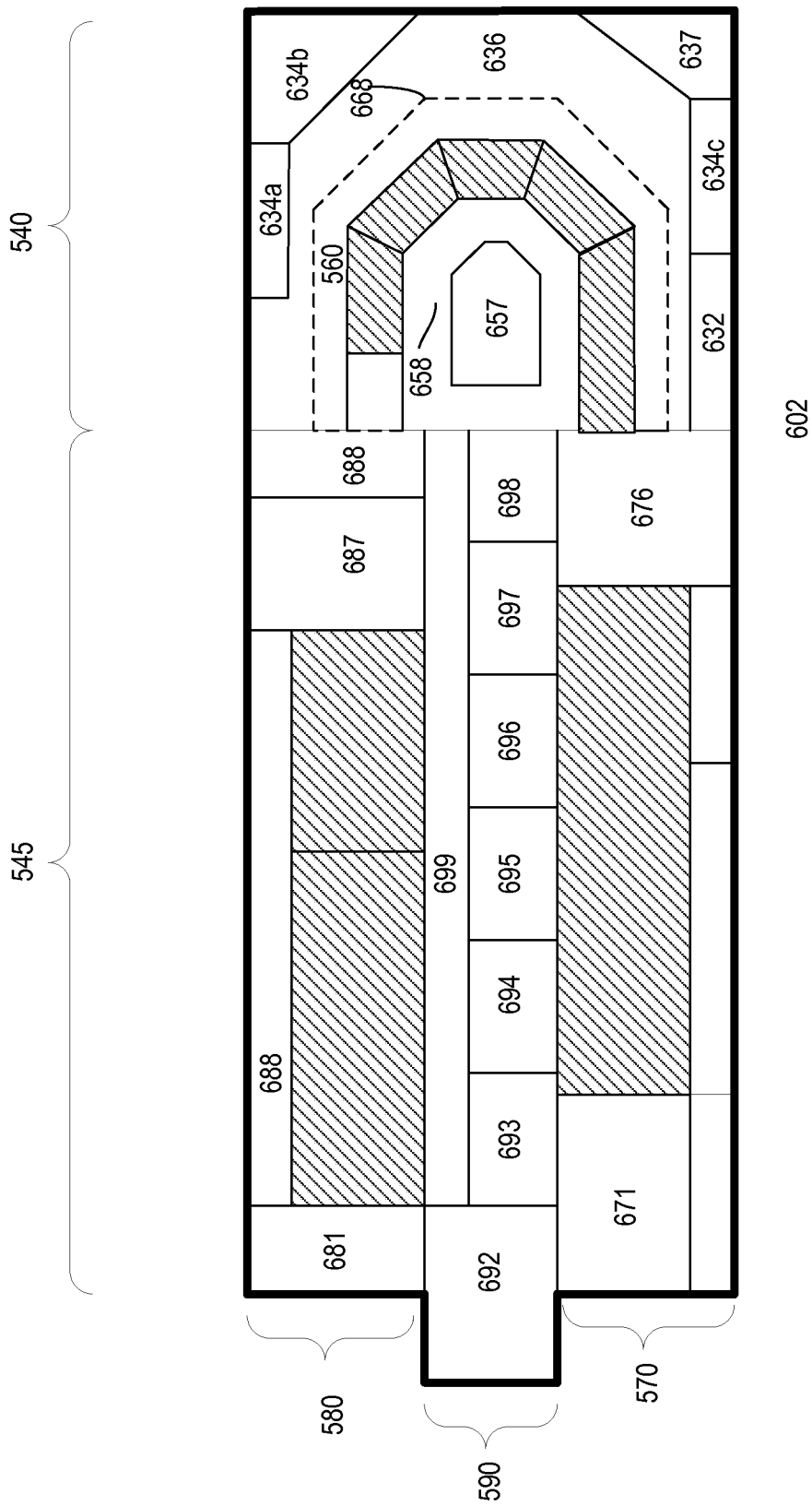

FIGS. 5-6 shows a manufacturing facility 501 in accordance with one embodiment of the invention. The facility is designed with a layout for efficient and effective manufacturing of products. Preferably, the facility facilitates efficient and effective manufacturing of pharmaceutical products which is compliant with CGMP and other regulations to which the manufacturing of pharmaceutical products are subjected.

FIG. 5 shows the first level 502 and FIG. 6 shows the second level 602 of the facility. Referring both to FIGS. 5-6, the building comprises a rectangular shape and includes production and production support areas 540 and 545. Lined-filled areas in the second level represent the same areas in the first level (e.g., such areas in the first level have ceilings extending to the top or other levels of the building). Providing a building with other shapes is also useful. In one embodiment, the production support area is on the left side of the building while the production area is on the right side. Each area is also rectangular in shape. Other configurations and/or shapes of the production and production support areas are also useful.

The production area comprises a hub 550. In one embodiment, the hub abuts a boundary 543 of the production and production support areas. In one embodiment, a manufacturing area partially surrounds the hub and also abuts the boundary of the production and production support areas. The manufacturing area 560 and hub comprises a semi-octagonal shape. Providing the manufacturing area and hub with other shapes is also useful. It is also understood that it is not necessary that both the hub and manufacturing area have the same shape. A manufacturing support area 530 surrounds the manufacturing area. In one embodiment, the manufacturing support area is located between the manufacturing area and boundary of the production area.

The manufacturing area is separated into a plurality of production stages 567*a*-567*g* for manufacturing one or more products. A processing stage can be used to perform one or more steps in the manufacturing process. For example, stages are used to perform front-end and back-end processes. Some stages, for example, can be duplicated. The sequence of the production stages are preferably arranged to optimize the production process. In one embodiment, the stages are arranged to facilitate flow of work from stage to stage, to the extent possible, in sequence. For example, the sequence of production stages are arranged to facilitate process flow in a counter-clockwise direction, as shown by arrow 548. Arranging the production stages to facilitate process flow in a clockwise direction is also useful.

Preferably, the production stages are used to form one or more pharmaceutical products. In one embodiment, the manufacturing area is located in a controlled environment. The production stages are physically separated by barriers. The manufacturing area includes stages 567*a-e* for dispensing processing material, granulation, tabletting, tablet coating, and capsule filling. Storage and interlevel stages 567*f-g* are also included in manufacturing area. The storing stage, for example, temporarily stores processed product for removal for testing and packaging. The interlevel stage, in one embodiment, includes elevator for facilitating movement between first and second levels. An air lock is also included in the interlevel stage to facilitate maintaining the integrity of the controlled environment. Additional or other stages as well as other stage sequence can also be useful.

In a preferred embodiment, the manufacturing area comprises first and second pseudo levels, as described in FIG. 3. The outer wall of the manufacturing area on the second level is inset with respect to the outer wall in the first level (indicated by the dotted line 668), creating a step above the first level in the cross-sectional profile of the manufacturing area. Providing a manufacturing area with such first and second pseudo levels takes advantage of gravity to charge the production stage equipment from outside the controlled environment of the manufacturing area. Other techniques or arrangements for charging the production stages are also useful.

Manufacturing support areas 530 are located outside the manufacturing area in first and second levels of the production area. The manufacturing support areas are preferably between the manufacturing area and boundary of the production area. Transport areas 536 and 636 are located in manufacturing support areas adjacent the manufacturing area. Bins, for example, are moved from stage to stage and level to level for charging and discharging of processing or processed materials in the transport areas. Preferably, the bins are transported using an automated transport system.

In one embodiment, washrooms (not shown), if appropriate, are located in the first level access area to facilitate washing of equipment through the wall of the manufacturing area. The washroom should physically be separated from the clean room environment of the manufacturing area to reduce contamination. Preferably, airlocks can be provided to enable access between the washroom and production stage. It is understood that not all stages need to be provided with its respective washroom.

The manufacturing support area can also include, for example, a wash area to clean the bins after use. Stairwells and/or elevators can be included in the manufacturing support area to facilitate movement between the levels. Additionally, the manufacturing support area can include technical area between the production area boundary and transport area. The technical area can serve various functions that, for example, support production. For example, the technical area in the second level includes a blending area 637, various plant rooms 634*a-c*, and a wash area 632 for bins. Other types of functions in lieu of and/or in additional those mentioned which support production can also be included in the manufacturing support areas of either and/or both levels, as desired. Preferably, the various support functions are located to optimize process flow.

In one embodiment, a hub 550 abuts the boundary between the production and production support areas and is partially surrounded by the manufacturing area. Providing a hub which does not abut the boundary between the production and production support areas is also useful. In such case, the manufacturing area can completely surround the hub. The hub preferably comprises first and second levels corresponding to the first and second levels of the facility. In one embodiment, the first level serves as a workflow hub while the second level serves as a control hub.

The workflow hub preferably is part of the controlled environment of the manufacturing area. The workflow hub facilitates the flow of products and/or people in the manufacturing area. In one embodiment, an access corridor 558 is provided in the workflow hub to facilitate flow of people and materials for processing. Preferably, a laboratory 556 is located in the workflow hub to test of the products at various stages of production. Providing the laboratory at the center allows convenient access from the production stages, increasing manufacturing efficiency. A support area 554 can also be provided to serve, for example, as a staging area, work in process storage area and/or support utility area.

The control hub, in one embodiment, is separated from the controlled environment. The control hub serves as a control area, enabling the manufacturing process to be monitored, identified, and verified easily and efficiently there from. In particular, the control hub has a direct line-of-sight to the production stages. Preferably, a viewing corridor 658 can be provided, enabling the production stages to be visible from the hub. A data center 657 can also be provided to receive manufacturing data from the processing stages. This can be performed in real time or after each process is completed, for example, communication links.

In one embodiment, the production support area comprises inflow and outflow areas 570 and 580. The inflow area comprises various sections for receiving, storing, and preparing materials for production. The various sections are preferably arranged to optimize process flow. For example, the flow of materials can be arranged to flow from one end of the inflow area to the other end adjacent to the production area. The outflow area comprises sections which receiving, testing, packaging, and storing processed products from the manufacturing area. Like the inflow area, the flow of material can be arranged to flow from one end of the outflow area adjacent to the production area to the other end.

In one embodiment, an unloading dock (not shown) is located at a first end of inflow area opposite the end adjacent to the production area. Raw materials are delivered and unloaded onto the unloading dock and moved to the receiving section 571. A material sampling section 572a can be provided to test the delivered materials to determine whether they are of acceptable quality or not. Accepted materials are moved to raw material storage section 574. Rejected materials are moved to rejected material storage section 572b for return to supplier. In a preferred embodiment, the material sampling and rejected material storage sections are located between the receiving and raw material storage sections. A pre-dispensing section 576 is located adjacent the raw material storage section and the production area. Raw materials are moved to the pre-dispensing section in preparation for processing. The sections are preferably arranged from the receiving end of inflow corridor to the end adjacent the production area.

Additional sections, such as inflow support storage, waste collection and waste storage sections 575 and 577a-b, can be included in the inflow area. The waste storage section should be located adjacent or in close proximity to the production area for receiving waste produced there from. Preferably, the waste collection section should be adjacent to the waste storage section. The inflow support storage is located adjacent or in close proximity to the raw material storage section. Providing the area with other sections to facilitate movement of raw material to the production area is also useful. The various sections can be arranged in other configurations. Preferably, the various sections are arranged to facilitate or optimize the flow of raw material to the production area.

In one embodiment, the outflow area comprises a loading dock (not shown) located at a first end opposite the end adjacent to the production area. Packaging and finished products storage sections 586 and 582 are also included. The sections are preferably arranged to optimize flow of processed material from the manufacturing area to shipping of the finished products to customers. For example, processed materials are discharged from the manufacturing area to a packaging section 586 located adjacent thereto. After the processed materials are packaged, they are stored in a finished product storage section 582. When ready for shipping to customers, the finished products are removed from storage and placed in the dispatched section 581 and loaded into transports (e.g., trucks) for delivery in the loading docks.

Additional sections can be included in the outflow area. In one embodiment, packaging and finished product support sections 587-588 are provided. For example, packaging support sections include packaging inspection, packaging supplies, and packaging office sections 587a-c to facilitate product packaging. Preferably, the packaging support sections are located adjacent to the packaging section. The finished product support section and is preferably located adjacent to the finished product storage section. Other sections can also be included in the outflow area, as desired.

In one embodiment, the various sections of the inflow and outflow areas are arranged to form a U-shaped process flow. Arranging the various section of the areas or the areas to produce other process flows, such as straight or L-shaped, are also useful. Preferably, the various sections are arranged to optimize the process flow.

The production support area preferably comprises a second level. The second level of the production support area comprises, for example, support section such as administration office, cafeteria, and research and development, charge to packing, and training sections 671, 681, 687, 688, and 676. As shown, packaging, finished product storage, and raw material storage sections have their ceilings extending to the top of the second level. Stairwells and/or elevators can be provided to facilitate movement between the levels. Other support sections can also be provided, as desired. The various support sections can be arranged to optimize flow or people and material.

A support area 590 can also be provided in the production support area. The support area, in one embodiment, is located between the inflow and outflow areas, forming a spine. The spine can serve as an extension to the hub, performing quality, monitoring functions in the production support area. In a preferred embodiment, the support area comprises first and second levels.

In one embodiment, the first level includes an entrance section 592 to the building located at an end of the spine opposite the end abutting the production area. The entrance preferably is a secured entrance to prevent unauthorized entrance to the building. A locker section 593 can be provided adjacent the entrance section, enabling employees to prepare for work. Quality and quality support sections 594 and 596, such as quality test lab and retained samples, are located in the first level. Additional sections 597-598, such as those to support quality or other functions can be included in the support area.

The second level can comprise various support sections. In one embodiment, the second level comprises boardroom, training, documentation reproduction and storage, meeting room, miscellaneous storage, clothing storage, and changing sections 692-698. A viewing corridor 699 is also included to enable visual monitoring of the packaging and finished product storage sections of the outflow corridor. Another viewing corridor can also be provided to enable visual monitoring of the inflow corridor. Other support sections can also be provided, as desired in the support area.

As described, the various sections of the production support area are arranged to facilitate flow of material and people in sequence. Other arrangements are also useful. Other sections can also be included in addition to or in lieu of sections described. Preferably, the sections are arranged to optimize the flow of people and material in the manufacturing process.

Figure 7A:
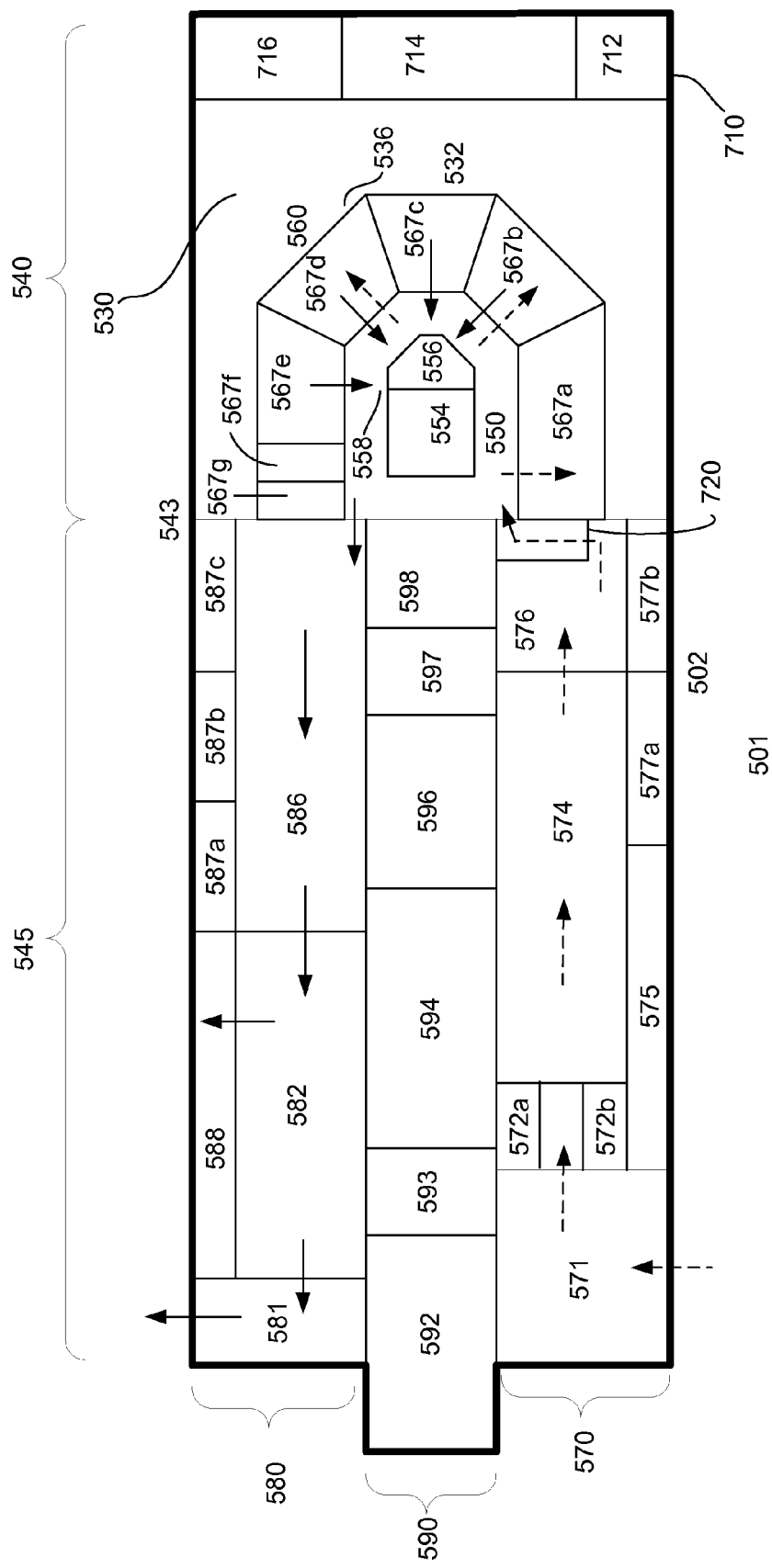
FIGS. 7a-b show raw material and processed material flow in the first and second level respectively of a production facility in accordance with one embodiment of the invention.

The production facility may further comprise a utility area. The utility area 710 (as shown in FIG. 7a), in one embodiment is situated at one end of the production facility. In one preferred embodiment, the utility area is situated adjacent to the manufacturing support area. The utility area serves as a buffer zone between the production area and the external environment. The availability of the utility area enables control of air quality, temperature and humidity of the production area. Providing a utility area at the opposite end of the production facility is also useful. The utility area, in accordance with one embodiment of the invention, comprises various utility rooms 712, 714 and 716, for example electrical switch room, processed water or purified water room and workshop. Other utility rooms can also be provided.

Figure 7B:
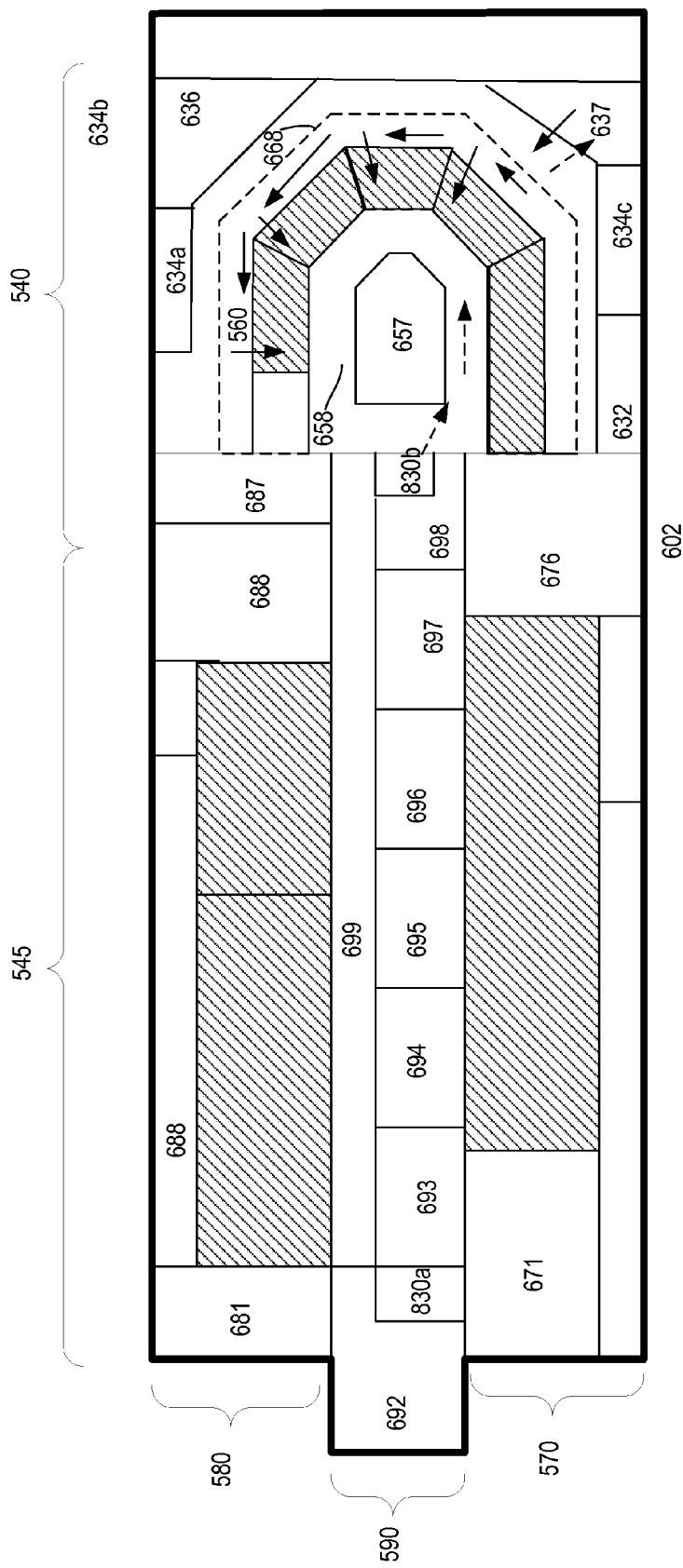

The layout also provides optimized flow of personnel, raw materials and processed materials. In one embodiment, the layout optimized the flow of people, raw materials and processed materials in compliance with GMP as required for pharmaceutical production. FIGS. 7a-b show raw and processed materials flow in the first and second level respectively of a production facility in accordance with one embodiment of the invention. Raw materials are unloaded and enter into the production area via receiving section 571 of the inflow area. The raw materials are transported to the raw material storage section 574 for temporary storage before dispensing to respective tools in the production area. In one embodiment, an air lock 720 is provided adjacent to the pre-dispensing section 576 to facilitate maintaining the integrity of the controlled environment. The raw materials are dispensed to various production stages, for example, dispensing, granulation and coating. Providing raw materials to other production stages or to manufacturing area in different level, for example, to the blender at second level, as shown in FIG. 7b, is also useful. On the other hand, the processed materials flow from various production stages, for example, granulation, tabletting, coating and capsule filling as shown in FIG. 7a. Processed materials can also be provided from other production stages transported using IBC or bins as disclosed earlier on. The processed materials are transported from the production area to the packaging section 586 in the production support area via the outflow area 580. The packaged products are transferred to the finished product storage before shipment. Some of the packaged products may be transported to the finished product support area for quarantine. The packaged products are transported to the dispatched section 581 before loading (not shown). Hence, the layout provides a counter-clock wise material flow. In one embodiment, the material flow is U-shaped. Providing clock wise and non U-shaped material flow is also useful.

Figure 8A:
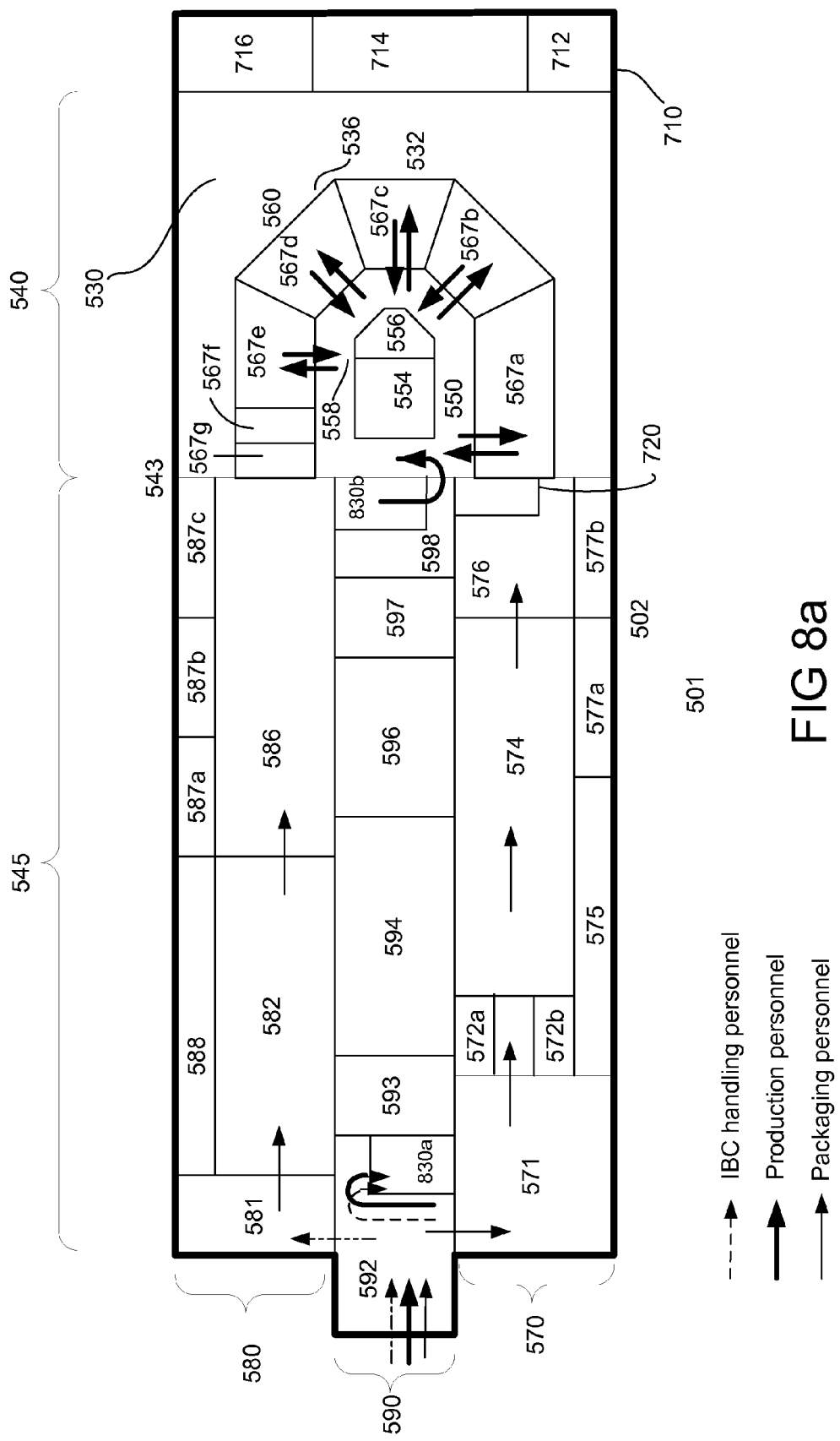
FIGS. 8a-b show movement of people in the first and second level respectively of a production facility in accordance with one embodiment of the invention.
Figure 8B:
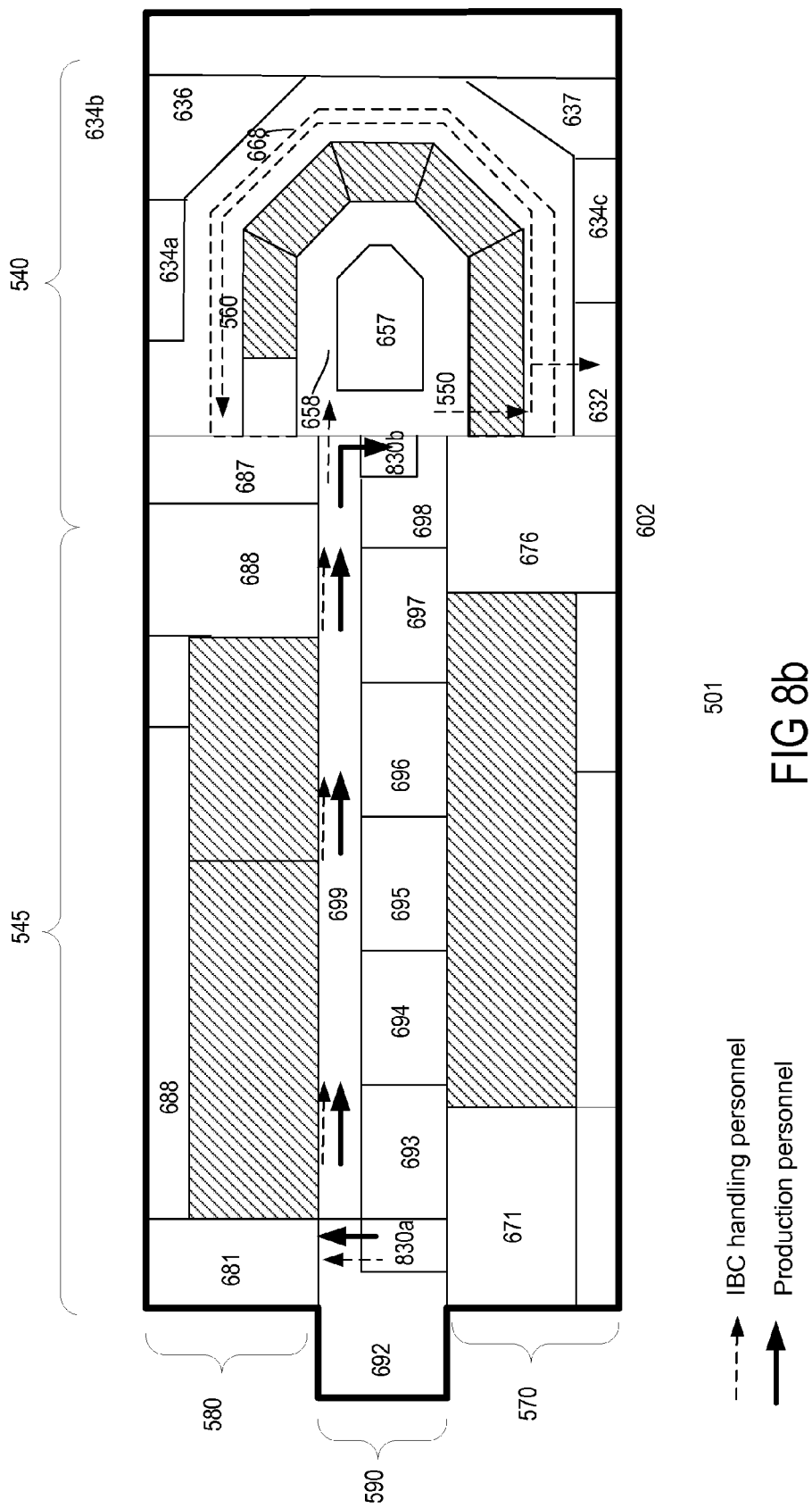

FIGS. 8a-b show movement of people in the first and second level respectively of a production facility in accordance with one embodiment of the invention. Personnel will generally enter the production facility at the same entrance 592. However, personnel from different departments can take separate routes to their respective work place. Stairwells and/or elevator 830a are provided to enable or facilitate movement of production personnel from first level to the second level. Viewing corridor 699 provides a path for the production personnel before entering into the production area. A second stairwells and/or elevator 830b leads the production personnel to the first level of the manufacturing area. In one embodiment, people in the manufacturing area, preferably move in bi-directions. For example, the personnel in the manufacturing area moves into the production stage for processing and come out from the same production stage for other work task. People in the manufacturing area generally do not go out from the manufacturing area to the manufacturing support area directly. Such arrangement is useful to control the movement of the production personnel hence reduces air particles being introduced into the controlled environment. A corridor (not shown) in between the production stages of the manufacturing area may be provided. This corridor provides access to the manufacturing support area during emergency. In one embodiment, the corridor is designed such that the access is uni-directional. To control the air quality of the control environment, no access is allowed from the manufacturing support area to the manufacturing area.

The layout, as described, can be extended for bio pharmaceutical products applications. For example, access to the production stages by personnel is from within the manufacturing area. However, exits are provided from the production stages to the manufacturing support area.

Figure 9A:
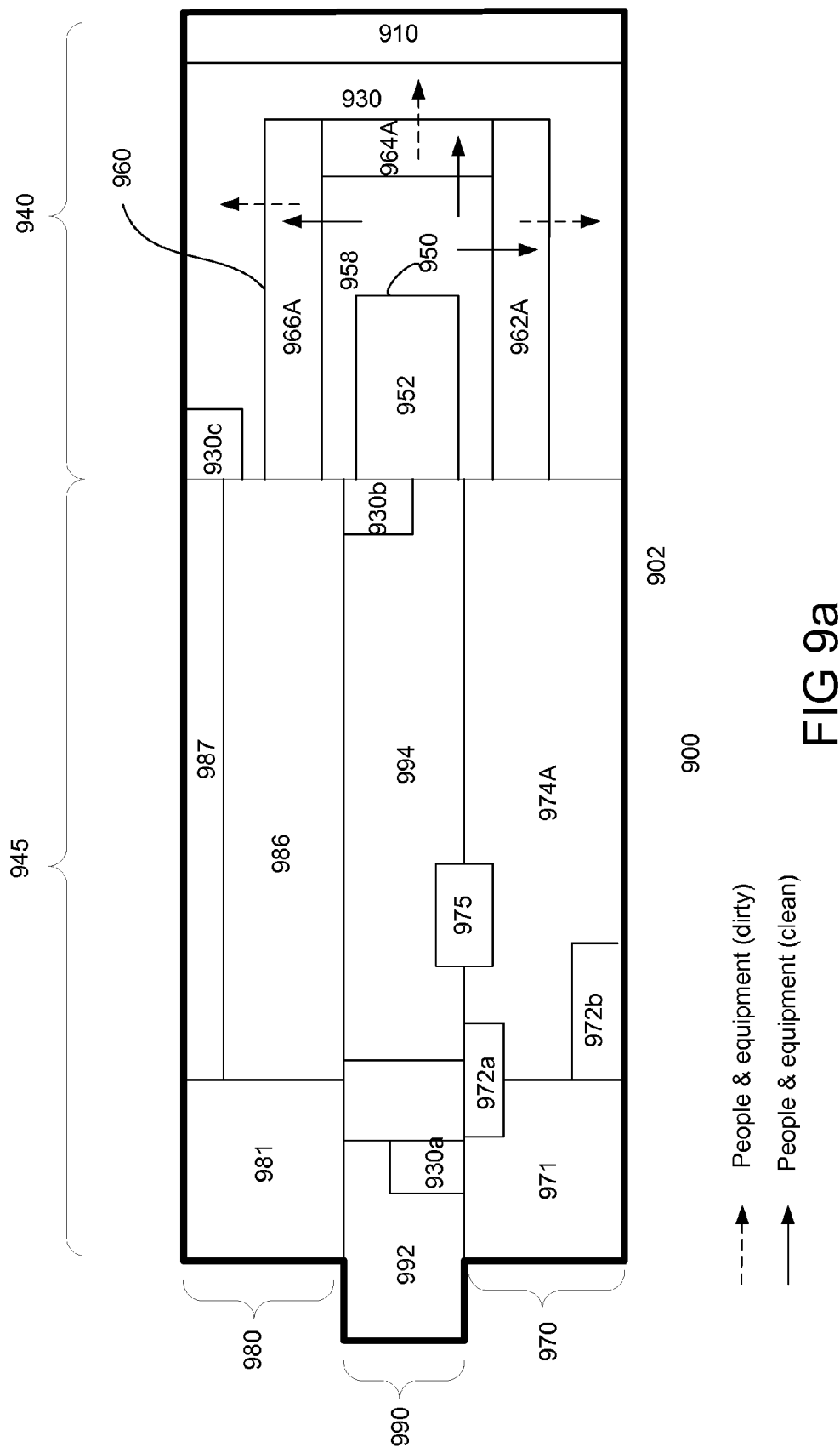
Figure 9B:
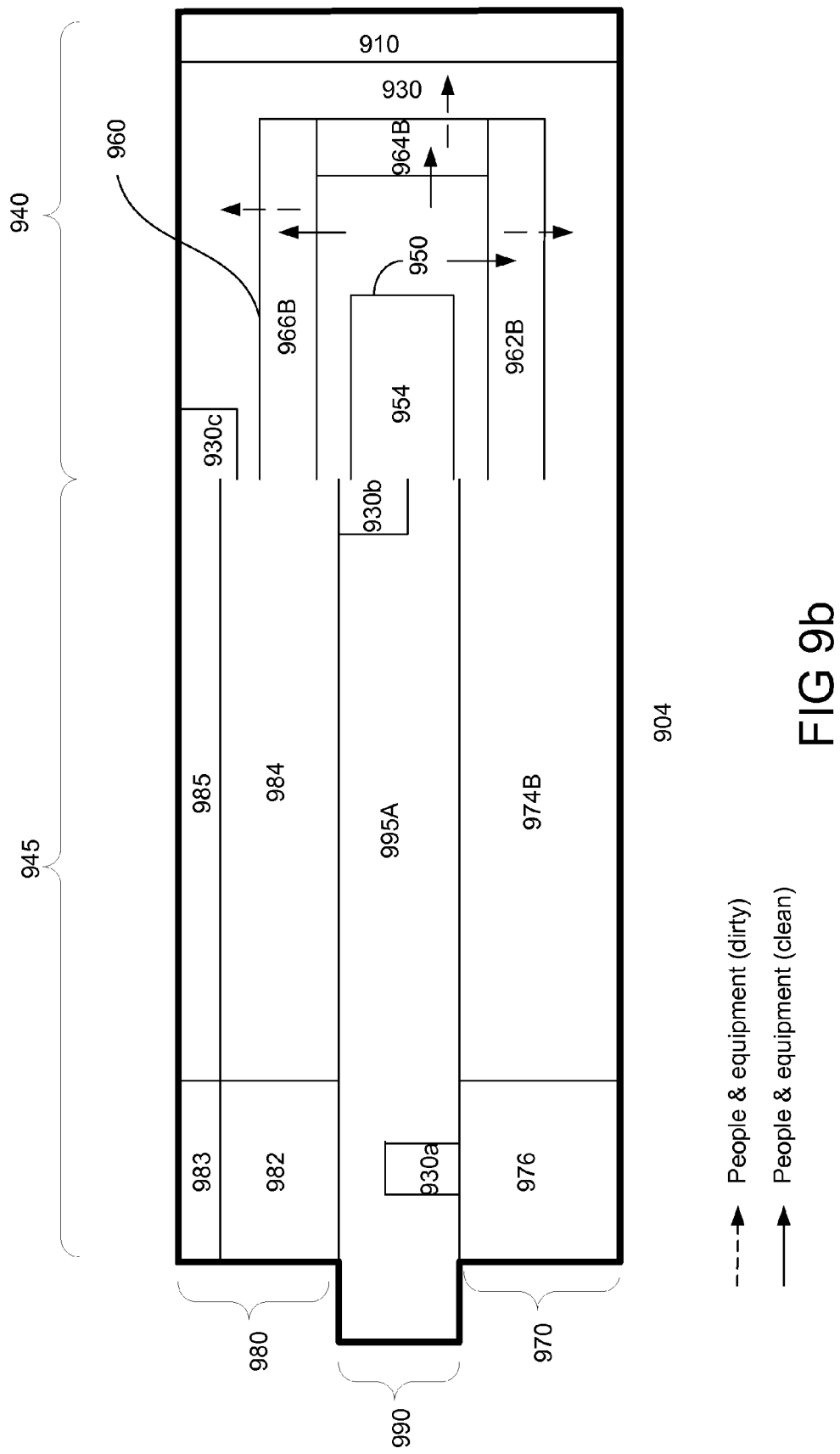

FIGS. 9a-c shows one embodiment of a production facility 900 for bio pharmaceutical applications. As shown, the production facility can comprise first, second and third levels 902, 904 and 906. Providing other number of levels is also useful. The production facility comprises a production and non production or production support areas 940 and 945. In one embodiment, the non production area is situated on one side of the building (e.g., left) while the production area is on the other side (e.g., right). Providing other arrangements is also useful.

The production area comprises a hub 950. In one embodiment, the hub abuts a boundary of the production and production support areas. In one embodiment, a manufacturing area 960 partially surrounds the hub and also abuts the boundary of the production and production support areas. A manufacturing support area 930 surrounds the manufacturing area 960. In one embodiment, the production area further comprises a utility area 910 situated adjacent to the manufacturing support area. Providing the utility area in non production area is also useful.

The manufacturing area is separated into a plurality of production stages 962-966 for manufacturing one or more bio pharmaceutical products. In one embodiment, the manufacturing area is located in a controlled environment. The manufacturing area in the first level of the production facility includes stages 962A, 964A and 966A for chromatography, microfiltration and final formulation as shown in FIG. 9a. The production stages, in accordance with one embodiment of the invention, are arranged in such a way where a counter-clock wise process flow is provided. Providing other stages and other arrangement of production stages is also useful. The hub, in the first level, includes a cleaning room 952 for cleaning the equipments in accordance with one embodiment of the invention.

In a preferred embodiment, the manufacturing area comprises first, second and third levels. The production area, in one embodiment, comprises an elevator 930c to facilitate movement of materials between the 3 levels. Additional elevators may also be provided. Manufacturing support areas 930 are located outside of the manufacturing area in the 3 levels of the production area. Transport area for bins for charging and discharging of raw or processed materials may be provided in the manufacturing support area.

In one embodiment, the non production area comprises inflow and outflow areas 970 and 980. The inflow area of the first level as shown in FIG. 9a comprises various sections for receiving 971, sampling 972a, quarantine 972b, refrigerating 975 and storing and preparing raw materials 974A for production. The various sections are arranged to optimize process flow. The flow of materials, in one embodiment, is arranged to flow from one end of the inflow area to the other end adjacent to the production area. The outflow area comprises sections for filling and finishing 986, sterile drying or refrigerating 987, and storing processed products 981 from the manufacturing area. The flow of materials in the outflow area can be arranged to flow in a similar way as the inflow area.

The production support area includes a support area 990. The support area, in one embodiment, is located between the inflow and outflow areas, forming a spine. The spine, can be used for performing quality control or testing 994. Other sections for other functions may also be included in the spine. The first level of the production support area, in one embodiment, comprises an entrance section 992 located at an end of the spine opposite the end abutting the production area. The entrance is a secured entrance for personnel to access to the production facility. A locker section or a changing room may be provided adjacent to the entrance. Stairwells and elevators 930 may be provided at the entrance to facilitate movement of people between levels.

FIG. 9b shows a second level 904 of the production facility. The production area in the second level has similar configurations as the production area of the first level. Like the manufacturing area in the first level, the manufacturing area in the second level is also separated into a plurality of production stages 962B-966B. Some stages, for example can be duplicated. The sequence of the production stages are arranged to facilitate process flow from stage to stage, to the extent possible, in sequence of process flow to produce the bio pharmaceutical products. For example, the manufacturing area includes stages for housing equipments like harvest tanks 962B, bioreactors 964B and seed reactors 966B. Other production stages may also be provided. The sequence of the production stages in the second level is arranged to facilitate flow in a clock wise direction, i.e. from seed reactors to harvest tanks. Arranging the production stages to facilitate process flow in a counter-clock wise direction is also useful.

In one embodiment, the production support area in the second level of the production facility comprises, for example, support sections such as administration office, storage for frozen products, sample storage, spinner flask, research and development, sterilization or refrigeration sections 976, 982, 983, 984 and 985. As shown, storage section 974B may be provided. Alternatively, the storage section can also be the same section in the first level having its ceiling extending to the top of the second level.

A support passage 995A can also be provided in the second level of the production support area. The support passage, in one embodiment, is located at the center of the production support area, forming a spine. The spine can be used to monitor functions in the production support area and provide access for people to enter into the production area. In a preferred embodiment, the support passage comprises second and third levels. Stairwells or elevators 930a and 930b are provided at both ends of the support passage to facilitate flow of people between levels.

FIG. 9c shows a third level 906 of the production facility. Unlike the manufacturing area in the second level, the manufacturing area in the third level is separated into a plurality of material preparation stages 962C-966C. Some stages, for example can be duplicated. The sequence of the material preparation stages in the third level are arranged to facilitate material flow to the production stages in the second level. For example, the manufacturing area in the third level includes material preparation stages for housing equipments like buffer preparation tanks 962C, buffer hold tanks 964C, media feed tanks 964D and media preparation tanks 966C. Other material preparation stages may also be provided. Bins (e.g., intermediate bulk containers (IBCs) or other types of containers) can be located in the third level. A bin, for example, contains raw materials or processing material which will be charged or fed to equipment or a process operation in a production stage in the second level for processing. Other techniques for charging, such as vacuum techniques or gravity feed, are also useful. After processing is completed, the processed material is discharged to a bin for transport to either another stage for further processing, testing or packaging.

FIGS. 9a-b show movement of people in the first and second level respectively of a production facility in accordance with one embodiment of the invention. Movement of people with clean equipments is depicted with solid arrows whereas movement of people with dirty equipments is depicted in dotted arrows. In one embodiment, people in the manufacturing area for producing bio pharmaceutical products, preferably move in a uni-direction. For example, personnel retrieve clean equipment from the hub and move into the production stages for processing and remove the dirty equipments to the manufacturing support area for cleaning. Such control of people flow in the manufacturing area would minimize undesirable contamination.

A cross section of the production facility in accordance with one embodiment of the invention is shown in FIG. 9d. The material flow of the production facility is depicted by the arrows. As shown in FIG. 9d, raw materials are prepared in the top or third level of the production facility and discharged, for example, via gravity feed, to the respective equipments in the production stages in the second level. The processed materials is transported or discharged to another production stage for further processing. In one embodiment, the stages are arranged to facilitate flow of work from stage to stage, to the extent possible, in sequence to optimize production. For example, the sequence of production stages are arranged to facilitate process flow in a counter-clock wise direction from second level to first level. Alternatively, the stages can be arranged to facilitate process flow in a clock wise direction. Both arrangements yield a substantially U-shaped flow. Providing other flow shapes can also be useful.

The layout, as described, provides an efficient process flow. For example, work flows along the manufacturing area while product testing and flow of information are toward the center to the hub area. Furthermore, since the hub has a direct line-of-sight and access to manufacturing data, the layout enables easy monitoring of the manufacturing process, effectively assuring that the flow of materials, people, products are efficient, correct, and verified. Additionally, the layout provides flexibility in design and construction of production stages. The segmented production stages could easily be removed and modified without affecting other production stages if production conditions, change in environmental and energy related issues or more stringent GMP requirements are required in the future. The layout also minimizes the number people going through the manufacturing area (e.g., people can view the production area from the hub without having to enter the production area), facilitating control of the production environment (e.g., temperature, dust, and humidity) and to prevent contamination. This facilitates control of the production environment. Such advantages reduce manufacturing costs by increasing efficiency and reducing errors while being compliant with CGMP.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

What is claimed is:

1. A method for manufacturing a product comprising:
providing an enclosed structure containing a manufacturing facility, the manufacturing facility having abutting production and non-production areas,
the production area includes
a hub having a first hub portion on an upper level of the enclosed structure abutting the non-production area, wherein the first hub portion is physically separated from a controlled environment of the production area and provides a direct line of sight to monitor manufacturing processes in the production area, and
a manufacturing area surrounding a second hub portion of the hub on a lower level of the enclosed structure, the manufacturing area including first or inflow manufacturing end and second or outflow manufacturing end, the inflow and outflow manufacturing ends abutting the non-production area,
the non-production area includes
inflow non-production areas, the inflow non-production area having first and second inflow ends wherein the second inflow end abuts the first manufacturing end, and
an outflow non-production area having first and second outflow ends, the first outflow end of the non-production area abuts the second manufacturing end of the manufacturing area;
receiving raw materials for the manufacturing of the product at the first end of the inflow non-production area;
transferring raw materials to the production area to be processed to form a processed product;
transferring the processed product from the production area to the outflow non-production area; and
post-processing of the processed product in the outflow non-production area, wherein processing flow from raw materials to processed products comprises a sequential or continuous flow progressing from the first inflow end to the second outflow end.

2. The method of claim 1 wherein the manufacturing area comprises a plurality of production stages for performing manufacturing processes of the product.

3. The method of claim 2 wherein the production area comprises first and second levels with the production stages located in the first level and comprises transferring materials for processing into the production stages from the second level.

4. The method according to claim 1 wherein the process flow is a U-shaped process flow.

5. The method according to claim 1 wherein the production area further comprises a manufacturing support area which substantially surrounds the manufacturing area.

6. The method according to claim 5 wherein through-the-wall equipments are provided in the manufacturing area such that equipments are maintained through a barrier in the manufacturing support area.

7. The product produced by the method of claim 1 comprising semiconductors, chemical products, food processing, biotechnical or pharmaceutical products.

8. A method for manufacturing a pharmaceutical product comprising:
providing an enclosed structure containing a manufacturing facility, the manufacturing facility having abutting production and non-production areas,
the production area includes
a hub having a first hub portion on an upper level of the enclosed structure abutting the non-production area, wherein the first hub portion is physically separated from a controlled environment of the production area and provides a direct line of sight to monitor manufacturing processes in the production area, and
a manufacturing area surrounding a second hub portion of the hub on a lower level of the enclosed structure, the manufacturing area including first or inflow manufacturing end and second or outflow manufacturing end, the inflow and outflow manufacturing ends abutting the non-production area,
the non-production area includes
inflow non-production areas, the inflow non-production area having first and second inflow ends wherein the second inflow end abuts the first manufacturing end, and
an outflow non-production area having first and second outflow ends, the first outflow end of the non-production area abuts the second manufacturing end of the manufacturing area;
receiving raw materials for the manufacturing of the pharmaceutical product at the first end of the inflow non-production area;
transferring raw materials to the production area to be processed to form a processed pharmaceutical product;
transferring the processed pharmaceutical product from the production area to the outflow non-production area; and
post-processing of the processed pharmaceutical product in the outflow non-production area, wherein processing flow from raw materials to processed products comprises a sequential or continuous flow progressing from the first inflow end to the second outflow end.

9. The method according to claim 8 wherein the manufacturing area comprises a plurality of production stages, the production stages comprises dispensing, granulation, tabletting, coating and capsule filling.

10. The method according to claim 8 wherein the process flow is a U-shaped process flow.

11. A method for manufacturing a product comprising:
providing an enclosed structure containing a hub and a manufacturing area surrounding the hub,
the hub includes
a first hub portion on an upper level of the enclosed structure, wherein the first hub portion is physically separated from a controlled environment of the manufacturing area and provides a direct line of sight to monitor manufacturing processes in the manufacturing area, and the manufacturing area includes
first or inflow manufacturing end and second or outflow manufacturing end, the manufacturing area surrounds a second hub portion on a lower level of the enclosed structure;
receiving raw materials in the inflow end of the manufacturing area;
processing raw material to produce the product in the manufacturing area;
transferring the product out of the manufacturing area at the outflow end, wherein processing flow from raw materials to the products comprises a sequential or continuous flow progressing from the inflow end to the second outflow end.

12. The method of claim 11 wherein the manufacturing area comprises a plurality of production stages for performing manufacturing processes of the product.

13. The method of claim 12 wherein the manufacturing area comprises first and second levels with the production stages located in the first level and comprises transferring materials for processing into the production stages from the second level.

14. The method according to claim 13 wherein the process flow is a circular process flow.

15. The method according to claim 11 wherein the production area further comprises a manufacturing support area surrounding the manufacturing area.

16. The method according to claim 15 wherein through-the-wall equipments are provided in the manufacturing area such that equipments are maintained through a barrier in the manufacturing support area.

17. The product produced by the method of claim 11 comprising semiconductors, chemical products, food processing, biotechnical or pharmaceutical products.

18. A method for manufacturing a pharmaceutical product comprising:
providing an enclosed structure containing a hub and a manufacturing area surrounding the hub,
the hub includes
a first hub portion on an upper level of the enclosed structure, wherein the first hub portion is physically separated from a controlled environment of the manufacturing area and provides a direct line of sight to monitor manufacturing processes in the manufacturing area, and
the manufacturing area includes
first or inflow manufacturing end and second or outflow manufacturing end, the manufacturing area surrounds a second hub portion on a lower level of the enclosed structure;
receiving raw materials in the inflow end of the manufacturing area;
processing raw material to produce the pharmaceutical product in the manufacturing area;
transferring the pharmaceutical product out of the manufacturing area at the outflow end, wherein processing flow from raw materials to the pharmaceutical product comprises a sequential or continuous flow progressing from the inflow end to the second outflow end.

19. The method according to claim 18 wherein the manufacturing area comprises a plurality of production stages, the production stages comprises dispensing, granulation, tabletting, coating and capsule filling.

20. The method of claim 19 wherein the production area comprises first and second levels with the production stages located in the first level and comprises transferring materials for processing into the production stages from the second level.

* * * * *